(12) United States Patent
Yamazaki et al.

(10) Patent No.: US 8,373,931 B2
(45) Date of Patent: Feb. 12, 2013

(54) LIQUID LENS AND APPARATUS INCORPORATING THE SAME

(75) Inventors: Shoichi Yamazaki, Yokohama (JP);
Shintetsu Go, Yokohama (JP); Ryo Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/206,674

(22) Filed: Aug. 10, 2011

(65) Prior Publication Data

US 2012/0050881 A1 Mar. 1, 2012

(30) Foreign Application Priority Data

Aug. 25, 2010 (JP) ................................. 2010-188655

(51) Int. Cl.
*G02B 1/06* (2006.01)
(52) U.S. Cl. ........................................ 359/665; 359/666
(58) Field of Classification Search ............ 359/665–667
See application file for complete search history.

(56) References Cited

U.S. PATENT DOCUMENTS

| | | | |
|---|---|---|---|
| 2007/0146895 A1* | 6/2007 | Oh et al. ........................ | 359/666 |
| 2010/0046084 A1* | 2/2010 | Kirita et al. .................... | 359/666 |
| 2010/0271709 A1* | 10/2010 | Takai et al. .................... | 359/665 |

FOREIGN PATENT DOCUMENTS

| | | |
|---|---|---|
| EP | 1701195 A1 | 9/2006 |
| FR | 2769375 A1 | 4/1999 |
| JP | 2001-519539 A | 10/2001 |
| JP | 2007-293349 A | 11/2007 |
| WO | 2004102250 A | 11/2004 |
| WO | 2007049280 A | 5/2007 |

\* cited by examiner

*Primary Examiner* — Evelyn A. Lester
(74) *Attorney, Agent, or Firm* — Canon U.S.A., Inc. IP Division

(57) ABSTRACT

A liquid lens includes a vessel having an inner wall and configured to contain liquid, an electrolyte liquid and a non-electrolyte liquid forming an interface therebetween and being contained in the vessel, and a voltage applying unit which applies a voltage to the electrolyte liquid. A shape of the interface between the electrolyte liquid and the non-electrolyte liquid is changed by application of the voltage. The inner wall of the vessel has varying affinity with the non-electrolyte liquid depending on a position on the inner wall where an end of the interface contacts the inner wall; and the affinity on the side of the inner wall where the non-electrolyte liquid is situated is lower than the affinity on the side of the inner wall where the electrolyte liquid is situated.

16 Claims, 23 Drawing Sheets

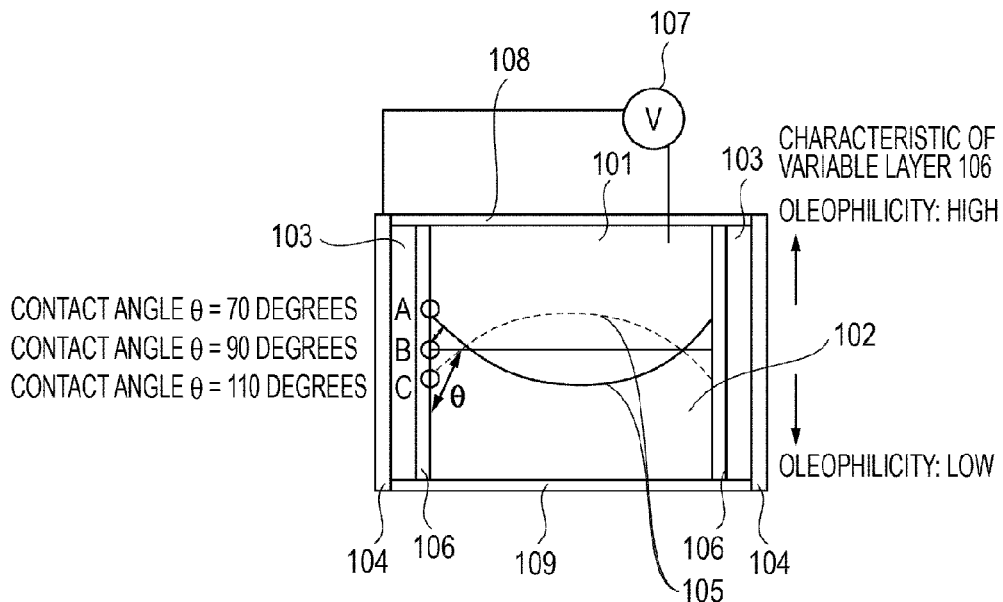
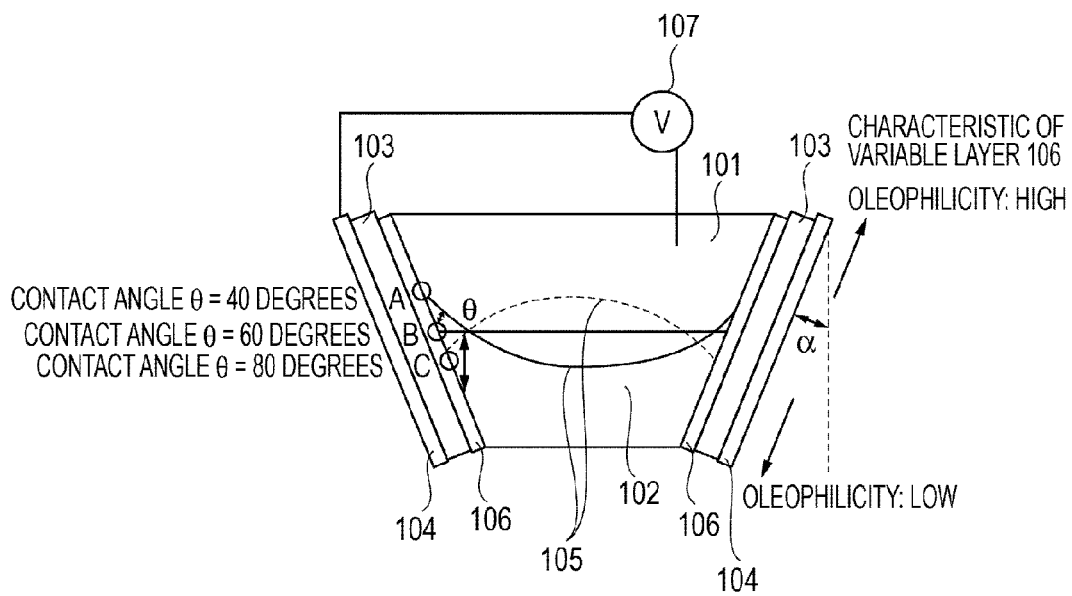

70° → 87° CHANGE
(Δ17°: LINEAR CHANGE)

70° → 107.5° CHANGE
(Δ37.5°: LINEAR CHANGE)

70° → 115° CHANGE
(Δ45°: LINEAR CHANGE)

70° → 88.5° CHANGE
(Δ18.5°: DIFFERENTIAL VALUE
MONOTONICALLY INCREASES)

70° → 113.6° CHANGE
(Δ43.6°: DIFFERENTIAL VALUE
MONOTONICALLY INCREASES)

70° → 107° CHANGE
(Δ37°: DIFFERENTIAL VALUE MONOTONICALLY INCREASES)

70° → 106.7° CHANGE: Δ36.7°
(DIFFERENTIAL ABSOLUTE VALUE BECOMES MAXIMUM
AT OPTICAL POWER "0" AROUND 90 DEGREES)

70° → 107.4° CHANGE
(Δ37.4°: LINE REPRESENTING MAXIMUM DIFFERENTIAL
ABSOLUTE VALUE AROUND 90 DEGREES)

40°→80° CHANGE: Δ40°
(DIFFERENTIAL ABSOLUTE VALUE BECOMES
MAXIMUM AT OPTICAL POWER "0" AROUND 60 DEGREES/
RELATED ART θ0 UNIFORM LAYER AROUND 40 DEGREES
AND 80 DEGREES)

LIQUID LENS AND APPARATUS INCORPORATING THE SAME

BACKGROUND OF THE INVENTION

1. Field of the Invention

The present invention relates to a liquid lens with variable refractive power and an apparatus incorporating the liquid lens.

2. Description of the Related Art

Liquid lenses have been studied and developed as a form of lens with variable refractive power.

Among several types of liquid lenses, a liquid lens which utilizes the principle of electrowetting has been intensively studied. The electrowetting effect has been defined as the change in solid-electrolyte contact angle due to an applied potential difference between the solid (electrode) and the electrolyte. Thus, electrowetting involves modifying the surface tension of liquids on a solid surface using a voltage. By applying a voltage, the wetting properties of a hydrophobic surface can be modified and the surface becomes increasingly hydrophilic (wettable). Applying this principle to a liquid lens, an angle between an interface between an electrolyte liquid and a non-electrolyte liquid and a solid member which the two liquids are in contact with (hereinafter, this angle is referred to as a "contact angle") is varied when a voltage is applied between the electrolyte liquid and an electrode.

Such electrowetting lenses are considered to be beneficial for certain imaging applications due to their rapid operation, sufficient surface accuracy of the interface, and the potential of low manufacturing cost resulting from the reduction in the size of the lens and the reduction in the number of parts.

The electrowetting lens incorporates an electrically conductive electrolyte liquid and a non-conductive non-electrolyte liquid with different refractive indices. The conductive electrolyte liquid and the non-conductive non-electrolyte liquid are immiscible liquids, that is, do not mix with each other but instead form a contact interface therebetween. Since these two liquids are sealed, application of a voltage between the electrolyte liquid and an electrode layer, which is disposed via an insulating layer, changes a contact angle of an end of the interface while the volume of the liquids remains unchanged.

The change in the contact angle causes a change in the sphere radius of curvature of the interface in accordance with the contact angle and a difference between the refractive indices of the two liquids induces a change in the optical refractive power. These two liquids typically are the same in density because a difference in density causes a distorted shape of a spherical surface of the interface due to the influence of gravity which leads to insufficient optical performance.

PCT Japanese Translation Patent Publication No. 2001-519539 (hereinafter "Patent Document 1") discloses an invention to reduce inconvenience of a deviation of the center of a droplet of an insulating liquid from its original central axis due to a deformation which the droplet undergoes when a focal length of a lens is varied by the deformation of the liquid in an electrically conductive liquid as a result of application of a voltage to the electrically conductive liquid.

Patent Document 1 discloses causing a change, on a region basis, in "wettability" of an inner wall of a dielectric chamber which the electrically conductive liquid and droplets of the insulating liquid disposed in the electrically conductive liquid are in contact with. In particular, Patent Document 1 discloses a liquid lens of which an inner wall surface of a chamber is processed to reduce "wettability" to the electrically conductive liquid in a radial direction toward the central axis O.

Japanese Patent Laid-Open No. 2007-293349 (hereinafter "Patent Document 2") discloses a liquid lens of which the shape of a contact surface which a liquid is in contact with is devised such that a change in curvature caused by application of a voltage is made in a more or a less sensitive manner.

In particular, Patent Document 2 implies that a change in the shape of a contact surface in which a liquid constituted by a base surface of an electrical conductive material coated with an insulating layer (i.e., an electrically conductive liquid and a non-electrically conductive liquid) may cause a change in curvature of a lens: a convex contact surface can make the change in a less sensitive manner and a concave contact surface can make the change in a more sensitive manner.

Patent Document 1 attempts to align the center of the droplet constituted by the insulating liquid with the central axis O of the droplet by causing "wettability" of the inner wall surface of the chamber with respect to the electrically conductive liquid to be lowered in a radial direction toward the central axis O. However, no attempt is made to achieve predetermined refractive power when a low voltage is applied.

Patent Document 2 discloses increasing sensitivity to a change in curvature of lens in response to application of a voltage by devising the shape of the contact surface which a liquid is in contact with (specifically, not providing a linearly tapered sectional shape of a common ring electrode but providing a concave-curved surface).

However, in an attempt to obtain a liquid lens with a concave contact surface, regarding a section which includes a cylindrical optical axis and is parallel to the optical axis, it is necessary to provide a concave ring electrode and an insulating layer which constitute the contact surface: such a concave surface is difficult to process and sufficient accuracy is required to process the same. Such a liquid lens is expensive to manufacture and, therefore, is difficult to be used as a liquid lens suited for mass production.

SUMMARY OF THE INVENTION

One aspect of the present invention is directed to a liquid lens which is inexpensive to manufacture and is subject to a large change in refractive power (i.e., high in sensitivity to application of a voltage) with low driving voltage.

A liquid lens, according to at least one embodiment of the present invention, includes a vessel having an inner wall and configured to contain liquid, an electrolyte liquid and a non-electrolyte liquid forming an interface therebetween and being contained in the vessel, and a voltage applying unit which applies a voltage to the electrolyte liquid. A shape of the interface between the electrolyte liquid and the non-electrolyte liquid is changed by application of the voltage. An inner wall of the vessel has varying affinity with the non-electrolyte liquid depending on a position on the inner wall where an end of the interface contacts the inner wall; and the affinity on the side of the inner wall where the non-electrolyte liquid is situated is lower than the affinity on the side of the inner wall where the electrolyte liquid is situated.

In the liquid lens according to the present invention, an inner wall of a vessel containing an electrolyte liquid and a non-electrolyte liquid and an end of an interface between these liquids is in contact with has varying affinity with the non-electrolyte liquid (oleophilicity) depending on the position. In particular, affinity is lower on the side of the non-electrolyte liquid than on the side of the electrolyte liquid. That is, wettability of the inner wall is more oleophobic on the side of the non-electrolyte liquid. With this configuration, it is possible to change a contact angle θ with a small variation in an applied voltage and thus to achieve a sensitive change in refractive power of the lens with low driving voltage and a small variation in the voltage.

Further features according to the present invention will become apparent from the following description of exemplary embodiments with reference to the attached drawings.

BRIEF DESCRIPTION OF THE DRAWINGS

FIG. 1 is a schematic diagram of an example of a liquid lens (with a cylindrical electrode) according to the present invention.

FIG. 2 is a schematic diagram of an example (with a planar-shaped cylindrical taper electrode) of the liquid lens according to the present invention.

DESCRIPTION OF THE EMBODIMENTS

Figure 3:
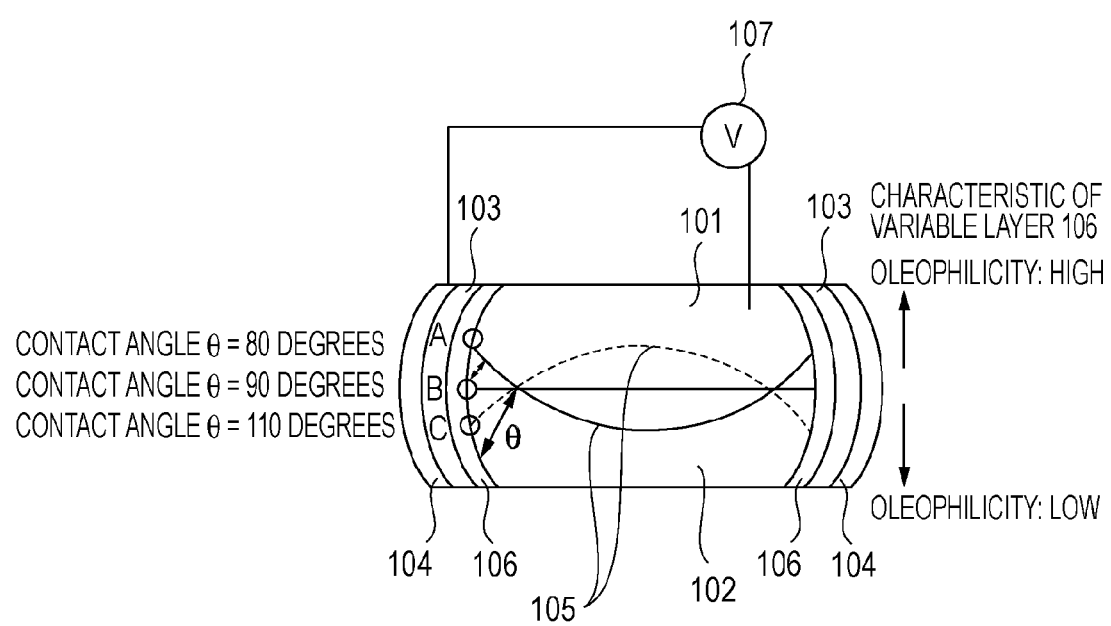
FIG. 3 is a schematic diagram of a cylindrical electrode (with a curved surface) which can be applied to the present invention.

FIG. 1 is a schematic sectional view illustrating an example of a liquid lens according to the present invention which incorporates a cylindrical vessel containing a liquid. FIG. 1 is taken along a plane which includes a central axis (i.e., an optical axis) of the cylindrical container.

As illustrated in FIG. 1, an insulating layer 103 is provided inside a cylindrical-shaped electrode 104 and forms a vessel which contains a liquid. An electrolyte liquid 101 and a non-electrolyte liquid 102 which are mutually immiscible are contained in the vessel. The electrolyte liquid 101 and the non-electrolyte liquid 102 have an interface 105 of which end is in contact with an inner wall of the vessel. Inside the insulating film 103, a layer 106 which forms an inner wall of the vessel and has varying affinity with the non-electrolyte liquid depending on the position on the inner wall (hereinafter, referred to as a "variable layer"). The variable layer 106 has affinity with the non-electrolyte liquid 102 which is relatively low on the side of the non-electrolyte liquid 102 than on the side of the electrolyte liquid 101. Typically, considering that the electrolyte liquid is an ionizable liquid and that the non-electrolyte liquid is an oil-based liquid, relatively low affinity with the non-electrolyte liquid can be translated as relatively low oleophilicity.

This means that oleophilicity is relatively high on the side of the electrolyte liquid and relatively low (i.e., oleophobicity is high) on the side of the non-electrolyte liquid.

A power supply 107 constitutes, together with an electrode 104, a voltage applying unit which applies a voltage to the electrolyte liquid 101. A front protection plate 108 and a rear protection plate 109 are constituted by a transparent, light transmissive material.

In the liquid lens according to the present invention, a contact angle θ, at which an end of the interface between the electrolyte liquid and the non-electrolyte liquid is in contact with the inner wall of the vessel which contains the liquid, and a voltage V applied to the electrolyte liquid can be expressed by the following Formula 1, which is called the Young's Formula:

$$\cos\theta = \cos\theta 0 - (\in/d/\gamma wo/2)*V2 \qquad \text{Formula 1}$$

where:
- θ0 is a contact angle at V=0 under no voltage application (i.e., an initial contact angle);
- ∈ is a dielectric constant of the insulating layer (i.e., a dielectric constant of the insulating layer 103 in FIG. 1);
- d is the thickness of the insulating layer; and
- γwo is interface energy between the electrolyte liquid (W) and the non-electrolyte liquid (O).

According to Formula 1, if the two liquids are in direct contact with the insulating layer (i.e., if the end of the interface moves on the insulating layer), θ0, ∈, d and γwo are constants and a function with V and θ being variables when the two liquid materials and the insulating layer are determined. When the contact angle θ of the end of the interface is determined, a sphere radius of curvature of the interface is determined from the diameter of the lens which depends on the size of the vessel containing the liquid lens. A focal length is then determined from the radius of curvature and the refractive indices of the two liquids (the refractive power is an inverse of the focal length).

The present invention is developed focusing on the COS θ0 component of Formula 1.

θ0 is the initial contact angle (applied voltage V=0) and is determined depending on a characteristic of a surface of the insulating layer which the end of the interface is in contact with. θ0 is typically a constant value. However, if θ0 is changed depending on the position on the surface of the insulating layer on which the contact position of the end of the interface moves, the V-θ characteristic can be changed. Thus sensitivity to a response of the contact angle with respect to the applied voltage can be controlled.

Changing θ0, which means changing wettability of the surface of the insulating layer depending on the position, is useful. In the present invention, sensitivity about the V-θ characteristic is increased with varying wettability of the surface of the insulating layer (i.e., the inner wall of the vessel) depending on the position, in particular, letting affinity with the non-electrolyte liquid be relatively low on the side of the non-electrolyte liquid than on the side of the electrolyte liquid.

The present invention includes a configuration in which not only wettability of the surface of the insulating layer is changed directly, but a thin variable layer with variable wettability is provided on the insulating layer which has a uniform characteristic.

In the present invention, relatively lowing affinity with the non-electrolyte liquid on the side of the non-electrolyte liquid than on the side of the electrolyte liquid includes letting relative hydrophilicity, hydrophobicity, oleophilicity or oleophobicity differ depending on the position on the surface of the insulating layer which the end of the interface is in contact with (i.e., the vessel inner wall).

In the liquid lens illustrated in FIG. 1, when a voltage is applied between the electrolyte liquid 101 and the electrode 104, the contact angle θ between the variable layer 106 which constitutes the inner wall of the vessel and the end of the interface 105 (i.e., on the side of the non-electrolyte liquid) is increased and a position of the end of the interface 105 is moved from A to C.

With this voltage application, the radius of curvature represented by a solid line (i.e., the end A of the interface 105) is changed to the radius of curvature represented by a dotted line (i.e., the end C of the interface 105) and refractive power is changed accordingly.

Wettability of the variable layer 106 is changed from the side of the electrolyte liquid 101 (point A of FIG. 1) to the side of the non-electrolyte liquid 102 (point C of FIG. 1) so that affinity (oleophilicity) with the non-electrolyte liquid 102 is lowered (i.e., oleophobicity is increased).

With this configuration, the change of the contact angle θ in FIG. 1 from 70 degrees (A) to 110 degrees (C) can be made with low driving voltage and a small voltage change compared with a configuration using a uniform layer with constant wettability (of which detailed description will be given later in the embodiments and comparative embodiments). The refractive index of the electrolyte liquid with respect to the D line of the electrolyte liquid (wavelength: 587.6 nm) is 1.4 and with respect to the D line of the non-electrolyte liquid is 1.6.

In the following description, the same components will be denoted by the same reference numerals throughout the drawings and repeated description will be omitted.

A liquid lens illustrated in FIG. 2 includes a tapered cylindrical electrode (with a tapered section) while the liquid lens illustrated in FIG. 1 includes a cylindrical electrode. FIG. 2 is a sectional view taken along a plane which includes a central axis (i.e., an optical axis) of a cylindrical container. An inner surface (i.e., an insulating layer) of a vessel which an end of an interface of liquids is in contact with is a plane when seen in a sectional view.

The liquid lens illustrated in FIG. 2 is substantially similar to that illustrated in FIG. 1 except that the tapered cylindrical electrode is used. A front protection plate 108 and a rear protection plate 109 are not illustrated in FIG. 2. As in the first embodiment, wettability of a variable layer 106 is changed such that affinity with the non-electrolyte liquid 102 is lowered (i.e., oleophobicity is increased) toward the non-electrolyte liquid 102 (i.e., point C) from the electrolyte liquid 101 (i.e., point A in FIG. 2) in the liquid lens of this embodiment.

In the liquid lens according to the present invention, the material property of the electrolyte liquid 101, the non-electrolyte liquid 102 and the variable layer 106 affects the interface energy: thus a range of the contact angle used as the liquid lens may vary.

For example, if a usage range of the contact angle is to be changed from 40 degrees to 80 degrees, the liquid lens with the tapered cylindrical electrode illustrated in FIG. 2 is desirably used.

In the liquid lens illustrated in FIG. 2, solid-state members (i.e., the insulating layer 103, the electrode 104 and the variable layer 106) have a taper angle α of 30 degrees with respect to the unillustrated optical axis in order to obtain the same change in a radius of curvature (i.e., the same change in the focal length) as that of the liquid lens with the cylindrical electrode illustrated in FIG. 1.

The taper angle of 30 degrees can increase the usage range of the contact angle from 40 degrees to 80 degrees and thus can provide a change in the contact angle from 70 degrees to 110 degrees. As a result, the same operation as the liquid lens illustrated in FIG. 1 is achieved.

A liquid lens illustrated in FIG. 3 is an example which includes a cylindrical electrode with a concave surface. The liquid lens illustrated in FIG. 3 is the same as that illustrated in FIG. 1 except for the inclusion of the cylindrical electrode with a concave surface. In the liquid lens illustrated in FIG. 3, the same change in a radius of curvature R as that of the liquid lens illustrated in FIG. 1 can achieve a further reduction in a contact angle θ with low driving voltage (i.e., the contact angle θ is reduced to 100 degrees from 80 degrees).

Hereinafter, components according to the present invention will be described in detail.

Vessel Containing Liquid

Various vessels can be used to contain the electrolyte liquid and the non-electrolyte liquid which are mutually immiscible and a cylindrical vessel of which refractive power can be changed from positive to negative or vice versa is especially suitable. Examples of the vessels include a cylindrical metallic material (e.g., aluminum, copper, iron or alloys thereof) of which inner surface is coated with an insulating layer and a variable layer, and a cylindrical glass or plastic material of which inner surface is coated with an electrically conductive layer, an insulating layer and a variable layer.

Electrolyte Liquid and Non-Electrolyte Liquid

Examples of the electrolyte liquid include salt-containing water. The salt may be, for example, a chloride compound or a bromide compound. Examples of the non-electrolyte liquid include an oil-based solvent, such as silicone oil, and various organic solvents. Combination of the electrolyte liquid and the non-electrolyte liquid can be determined such that the liquids have different refractive indices and immiscibility with each other; liquids which are equivalent or substantially equivalent in density are especially suitable when considering performance as a lens. Inner Wall Surface of Vessel Having Varying Affinity with Non-Electrolyte Liquid Examples of the surface of the inner wall of the vessel having varying affinity with the non-electrolyte liquid include: (i) a surface of the inner wall of the vessel coated with an insulating layer, the insulating layer being surface-treated to provide varying affinity depending on the position; (ii) a surface of the inner wall of the vessel coated with an insulating layer and a thin layer, the thin layer being surface-treated to provide varying affinity; and (iii) a surface of the inner wall of the vessel which itself is formed of an insulating material, the inner surface thereof being surface-treated to provide varying affinity depending on the position (the outside of the vessel is coated with a metallic material which constitutes the electrode).

Examples of the material of the thin layer used to coat the surface include an epoxy-based material, a silane coupling material and a parylene-based material, which are oleophilic materials.

These materials may be subject to UV irradiation, electron irradiation, corona discharge or ozone irradiation; with such treatments, the materials easily produce OH ions on the surfaces thereof and the characteristic of the surface of the thin layer changes from oleophilic to hydrophilic.

The variable layer according to the present invention becomes relatively oleophobic (i.e., hydrophilic) toward the non-electrolyte liquid from the electrolyte liquid. As the irradiation amount of the energy line is increased, the thin layer becomes highly oleophobic (i.e., hydrophilic) toward the non-electrolyte liquid from the electrolyte liquid. Varying affinity depending on the position means varying initial contact angle θ0 depending on the position. That is, a change in θ0 depending on the position can be variable by the control of the irradiation amount of energy depending on the position. For example, at positions where θ0 rapidly increases, the irradiation amount of energy may also be increased rapidly to enhance sensitivity to oleophobicity. Alternatively, a hydrophilic material may be used as the θ0 variable layer to lower oleophobicity (hydrophilicity) toward the electrolyte liquid from the non-electrolyte liquid.

If the cylindrical vessel is formed of a metallic material which has a function as an electrode and the inner surface of the metallic material is coated with the insulating layer and the variable layer which constitute the inner wall of the vessel, the following configuration may be provided. That is, after the thin layer is formed on the insulating layer, the surface of the thin layer is covered with a shield, the shield being moved in response to the irradiation time of the energy line to provide the inner wall of the variable layer with varying affinity.

If the cylindrical vessel is formed of a non-conductive plastic or glass material, the insulating layer and the variable layer are formed after an electrode material (e.g., aluminum, ITO and Ag) is coated.

The layers may be formed by, for example, vapor deposition or sputtering.

Other Description

The inner wall of the vessel may have varying affinity in the direction of the optical axis of the liquid lens. With this configuration, sensitivity to a change in the refractive power can be enhanced with low driving voltage and a small voltage change in both the cylindrical taper electrode and the cylindrical electrode. Here, the central axis and the optical axis of each of the cylindrical electrodes can be coincident with each other. If these axes are not coincident, the interface has an imperfect spherical surface shape which leads to insufficient optical performance.

It is also possible to constitute a zoom lens as a combination product of the liquid lens according to at least one embodiment described herein and a common lens, such as a glass lens and a plastic lens. The zoom lens can use the varying refractive power of the liquid lens for focusing or zooming. In this configuration, since the liquid lens is driven at a low voltage, no boost circuit to boost the voltage is necessary and thus the power supply of a camera can be used to drive the liquid lens.

The electrowetting liquid lens operates with low power consumption because the interface is moved by a capacitor effect of the applied voltage and thus substantially no electric current flows therethrough. The electrowetting liquid lens requires no focusing mechanism and thereby achieves rapid and silent autofocusing. It is also possible to use the varying refractive power of the liquid lens to change magnification by zooming. In this case, since a zooming mechanism becomes unnecessary or simplified, rapid and silent zooming is achieved in addition to the focusing.

Enhanced sensitivity to the refractive power with low driving voltage and a small voltage change in the liquid lens disclosed herein contributes to an increase in the response speed of the liquid lens.

The liquid lens according to any embodiment disclosed herein can be driven by a direct current voltage although an alternating voltage is suitable. The lower the driving voltage in the alternating current, the smaller the electromagnetic wave noise can be. Especially an image pickup element incorporated in a digital camera is easily subject to an influence of the electromagnetic wave noise; thus the low voltage contributes also to noise reduction.

Hereinafter, specific embodiments and comparative examples will be described with reference to respective figures corresponding thereto.

First Embodiment and First Comparative Embodiment

Figure 4A:
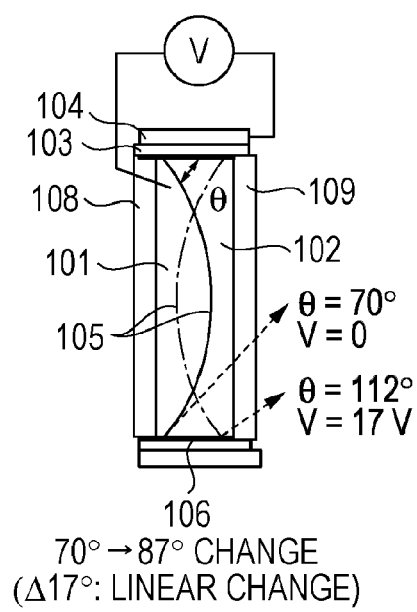
FIG. 4A is a schematic diagram of the liquid lens of a first embodiment (with a cylindrical electrode) according to the present invention.
Figure 4B:
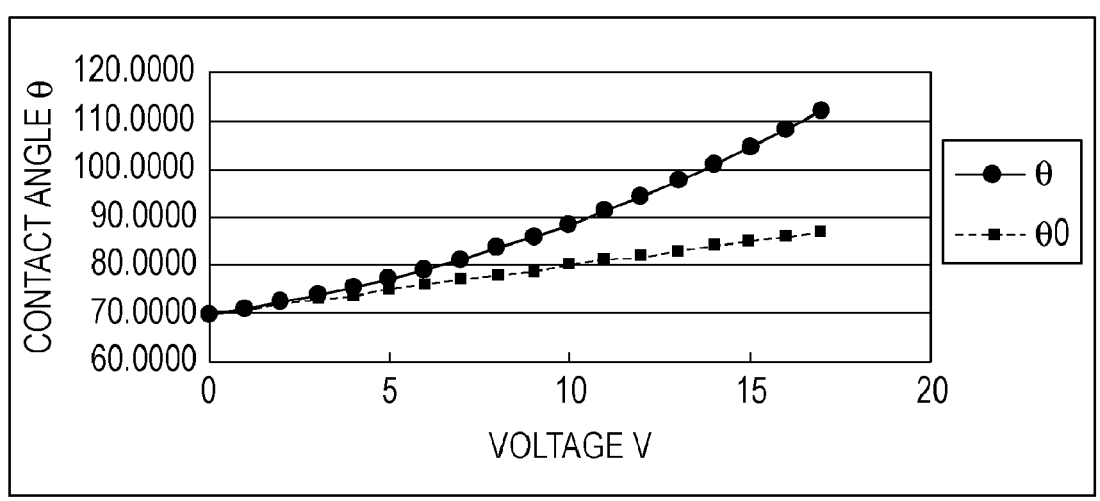
FIG. 4B is a V-θ graph.

FIG. 4A is a configuration diagram of the liquid lens according to the first embodiment (with a cylindrical electrode) and FIG. 4B is a V-θ characteristic graph. A V-θ characteristic table is given in Table 1.

The characteristic of a θ0 variable layer 106 will be described.

Wettability of the θ0 variable layer 106 when an end of the interface 105 is situated closest to the electrolyte liquid 101 is 70 degrees (i.e., the initial contact angle θ0=θ00 at V=0).

Wettability of the θ0 variable layer 106 when the end of the interface 105 is situated closest to the non-electrolyte liquid 102 (i.e., the initial contact angle θ0=θ0max at V=0) is increased to as large as 87 degrees (i.e., oleophobicity is increased). Wettability of the θ0 variable layer 106 is changed linearly from 70 degrees to 87 degrees as represented by a θ0 curve in FIG. 4B. The thickness d of the insulating layer 103 below the θ0 variable layer 106 is represented by d=1E-3 mm, the dielectric constant ∈ of the insulating layer 103 is represented by ∈=2.6E-11 F/m and the interface energy between the two liquids γwo is represented by γwo=8.78e−6 kN/m.

With this characteristic of the θ0 variable layer 106, an actual contact angle θ is changed from 70 degrees (θ=θ00) to 112.1 degrees (θ=θmax) (see the θ curve of FIG. 4B) when the applied voltage is increased from 0V to 17V. Focusing on the curve of θ0 in the graph of FIG. 4B, it is recognized that the variable layer 106 with controlled wettability increases the contact angle at the position where the end of the interface 105 situated closest to the non-electrolyte liquid 102 by 17 degrees (i.e., 87-70) and that, in the increased condition, the contact angle is further changed by application of a voltage to lower the applied voltage.

Here, first comparative embodiment for comparison will be given.

Figure 24A:
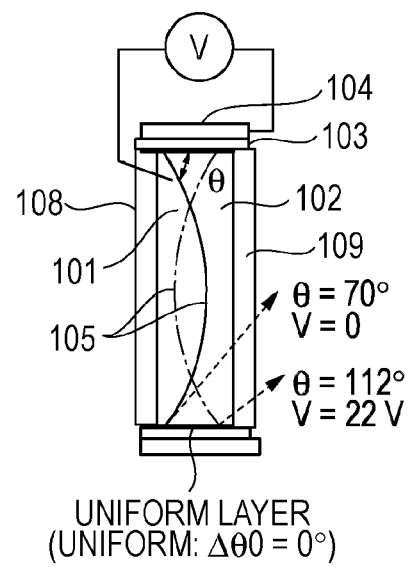
FIG. 24A is a schematic diagram of a related art liquid lens (with a cylindrical electrode).
Figure 24B:
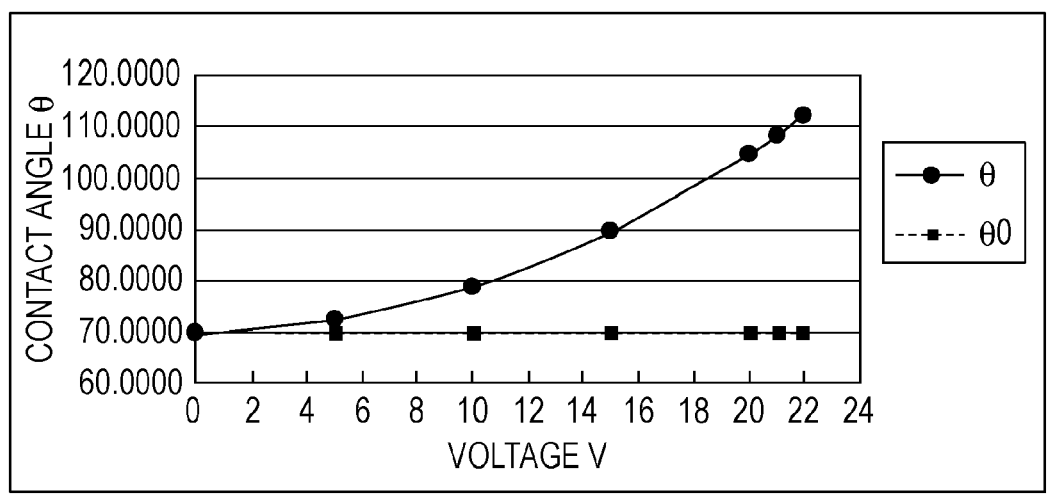
FIG. 24B is a V-θ graph.

FIG. 24A is a configuration diagram of a related art liquid lens which incorporates a uniform layer with uniform θ0 ("θ0 uniform layer"). FIG. 24B is a V-θ characteristic graph. A V-θ characteristic table of the first comparative embodiment is given in Table 2.

When the driving voltage in a range of 0V to 22V is applied, θ is changed from the contact angle θ=70 degrees (θ0 is also 70 degrees) at V=0 where the end of the interface 105 is situated closest to the electrolyte liquid 101 to the contact angle θ=112 degrees where the end of the interface 105 is situated closest to the non-electrolyte liquid 102.

The graph of FIG. 24B represents a θ curve from 70 degrees to 112 degrees. The θ0 curve indicates that there is no change in θ0. The thickness and the dielectric constant of the insulating layer 103 and the interface energy between the two liquids are the same as those of the first embodiment.

According to the data given above, it is recognized that, with the θ0 variable layer 106, the same change in the contact angle θ, i.e., from 70 degrees to 112 degrees (the same change in the radius of curvature R) is achieved with a small voltage change (ΔV: 22V to 17V). Formula Δθ0/Δθ=0.404 is given below Table 1.

Here, Δθ is expressed by the following formula:

$$\Delta\theta = \theta max - \theta 00$$

$$\Delta\theta 0 = \theta 0max - \theta 00.$$

In a movable range of the interface 105, the largest contact angle is set to θmax (on the side of the non-electrolyte liquid 102) and the initial contact angle under no voltage application representing wettability of the layer at the point (i.e., the θ0 variable layer 106) is set to θ0max. When V=0, i.e., no voltage is applied, the initial contact angle θ (i.e., on the non-electrolyte liquid 102) with the interface 105 situated closest to the electrolyte liquid 101 is set to θ00 (θ=θ00, the initial contact angle).

Second Embodiment

Figure 5A:
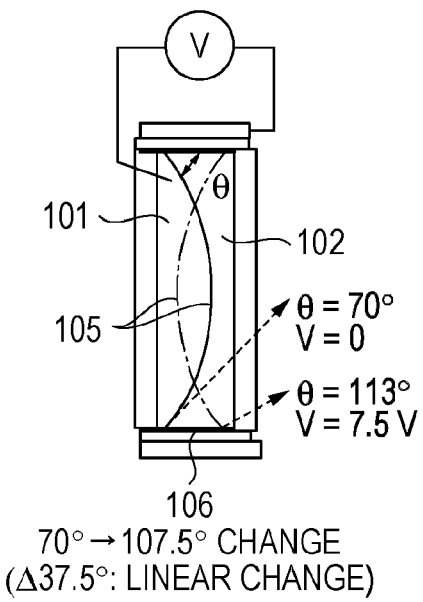
FIG. 5A is a schematic diagram of the liquid lens of a second embodiment (with a cylindrical electrode) according to the present invention.
Figure 5B:
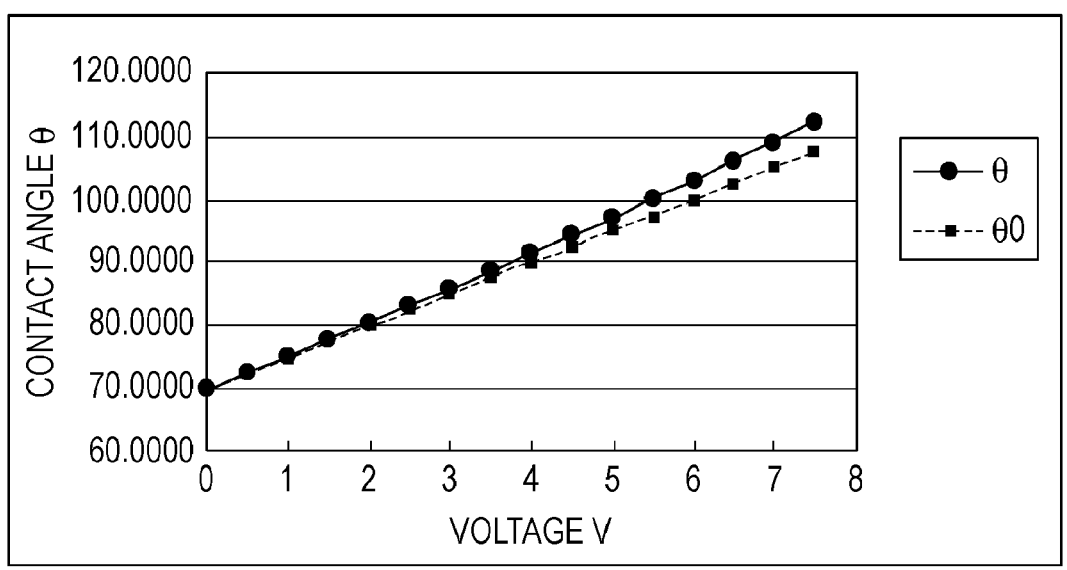
FIG. 5B is a V-θ graph.

FIG. 5A is a configuration diagram of the liquid lens according to the second embodiment (with a cylindrical electrode) and FIG. 5B is a V-θ characteristic graph. A V-θ characteristic table is given in Table 3.

The characteristic of a θ0 variable layer 106 will be described. Wettability of the θ0 variable layer 106 when an end of the interface 105 is situated closest to the electrolyte liquid 101 is 70 degrees (i.e., the initial contact angle θ0=θ00 at V=0). Wettability of the θ0 variable layer 106 when the end of the interface 105 is situated closest to the non-electrolyte liquid 102 (i.e., the contact angle θ0=θ0max at V=0) is increased to as large as 107.5 degrees (i.e., oleophobicity is increased). Wettability of the θ0 variable layer 106 is changed linearly from 70 degrees to 107.5 degrees as represented by a θ0 curve in FIG. 5B. The thickness of the insulating layer 103 below the θ0 variable layer 106, the dielectric constant of the insulating layer 103 and the interface energy γwo between the two liquids are the same as those of the first embodiment.

With this characteristic of the θ0 variable layer 106, an actual contact angle θ is increased from 70 degrees (θ=θ00) to 112.6 degrees (θ=θmax) (see the θ curve of FIG. 5B) when the applied voltage is increased from 0V to 7.5V. An example of a related art layer with uniform θ0 ("θ0 uniform layer") is illustrated in FIGS. 24A and 24B.

In the second embodiment, it is recognized that, with the θ0 variable layer 106, the same change in the contact angle θ, i.e., from 70 degrees to 112 degrees (the same change in the radius of curvature R) is achieved with a small voltage change (ΔV: 22V to 7.5V). Formula Δθ0/Δθ=0.881 is given below Table 3.

Since a change in Δθ0 in the θ0 variable layer 106 (i.e., change in wettability) is larger than that in the first embodiment, the amount of voltage change is reduced and thereby the liquid lens according to the second embodiment can be driven with a voltage of 7.5V that is smaller than half that of the related art θ0 uniform layer is used.

Third Embodiment

Figure 6A:
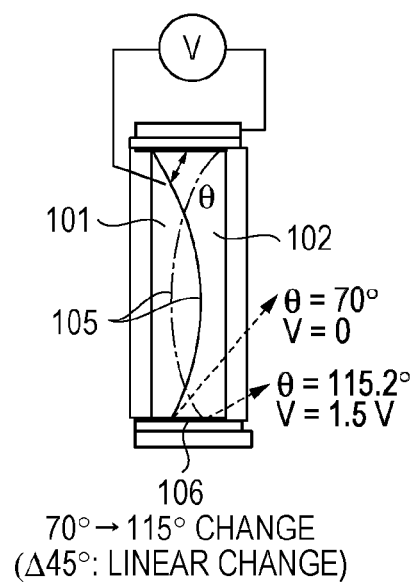
FIG. 6A is a schematic diagram of the liquid lens of a third embodiment (with a cylindrical electrode) according to the present invention.
Figure 6B:
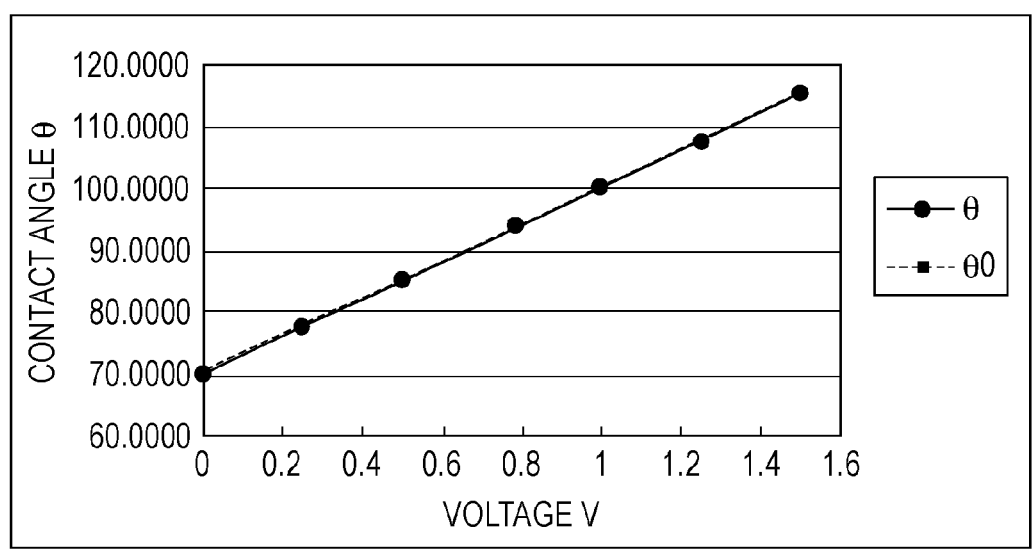
FIG. 6B is a V-θ graph.

FIG. 6A is a configuration diagram of the liquid lens according to the third embodiment (with a cylindrical electrode) and FIG. 6B is a V-θ characteristic graph. A V-θ characteristic table is given in Table 4.

The characteristic of a θ0 variable layer 106 will be described. Wettability of the θ0 variable layer 106 when an end of the interface 105 is situated closest to the electrolyte liquid 101 is 70 degrees (i.e., the initial contact angle θ0=θ00 at V=0). Wettability of the θ0 variable layer 106 when the end of the interface 105 is situated closest to the non-electrolyte liquid 102 (i.e., the initial contact angle θ0=θ0max at V=0) is increased to as large as 115 degrees (i.e., oleophobicity is increased). Wettability of the θ0 variable layer 106 is changed linearly from 70 degrees to 115 degrees as represented by a θ0 curve in FIG. 5B. The thickness of the insulating layer 103 below the θ0 variable layer 106, the dielectric constant of the insulating layer 103 and the interface energy γwo between the two liquids are the same as those of the first embodiment.

With this characteristic of the θ0 variable layer 106, an actual contact angle θ is changed from 70 degrees (θ=θ00) to 115.2 degrees (θ=θmax) (see the θ curve of FIG. 6B) when the applied voltage is increased from 0V to 1.5V.

An example of a related art layer with uniform θ0 ("θ0 uniform layer") is illustrated in FIGS. 24A and 24B.

In the third embodiment, it is recognized that, with the θ0 variable layer 106, the same change in the contact angle θ, i.e., from 70 degrees to 112 degrees (the same change in the radius of curvature R) is achieved with a small voltage change (ΔV: 22V to lower than 1.5V). Formula Δθ0/Δθ=0.995 is given below Table 4.

Since a change in Δθ0 (i.e., a change in wettability) in the θ0 variable layer 106 is larger than that in the first and second embodiments, θ0 in each position and the actual contact angle θ when voltage is applied is close to each other. Thus, substantially no voltage change is necessary. It is therefore recognized that a change in power (from θ: 70 degrees to θ: 115 degrees) is achieved with a driving voltage of as small as 1.5V.

Fourth Embodiment

Figure 7A:
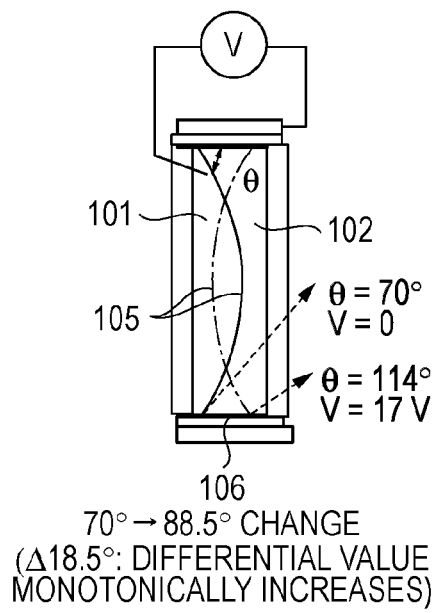
FIG. 7A is a schematic diagram of the liquid lens of a fourth embodiment (with a cylindrical electrode) according to the present invention.
Figure 7B:
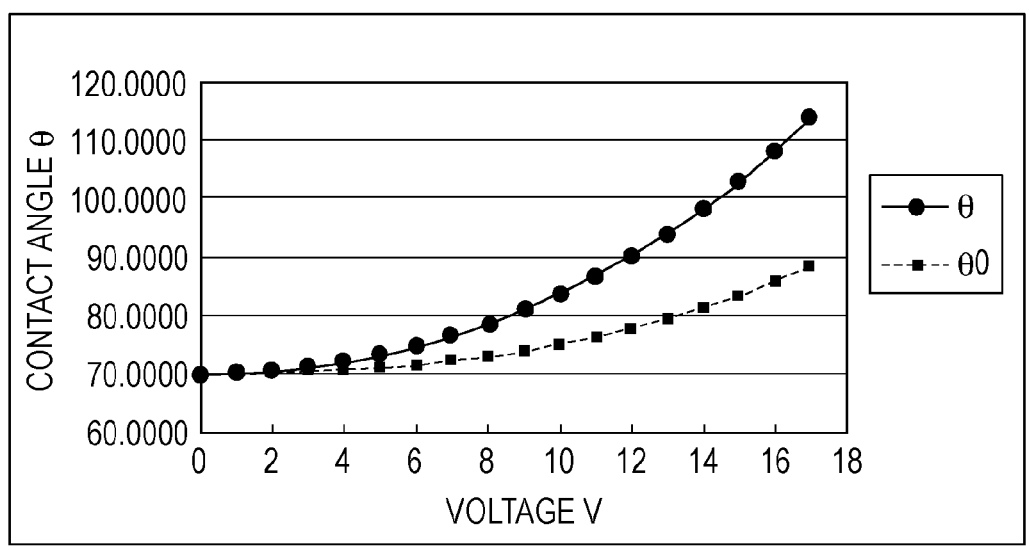
FIG. 7B is a V-θ graph.

FIG. 7A is a configuration diagram of the liquid lens according to the fourth embodiment (with a cylindrical electrode) and FIG. 7B is a V-θ characteristic graph. A V-θ characteristic table is given in Table 5.

The characteristic of a θ0 variable layer 106 will be described. Wettability of the θ0 variable layer 106 when an end of the interface 105 is situated closest to the electrolyte liquid 101 is 70 degrees (i.e., the initial contact angle θ0=θ00 at V=0). Wettability of the θ0 variable layer 106 when the end of the interface 105 is situated closest to the non-electrolyte liquid 102 (i.e., the initial contact angle θ0=θ0max at V=0) is increased to as large as 88.5 degrees (i.e., oleophobicity is increased). A change in wettability of the θ0 variable layer 106 differential monotonically increases from 70 degrees to 88.5 degrees as represented by a θ curve in FIG. 7B. The thickness of the insulating layer 103 below the θ0 variable layer 106, the dielectric constant of the insulating layer 103 and the interface energy γwo between the two liquids are the same as those of the first embodiment.

With this characteristic of the θ0 variable layer 106, an actual contact angle θ is changed from 70 degrees (θ=θ00) to 113.7 degrees (θ=θmax) (see the θ curve of FIG. 7B) when the applied voltage is increased from 0V to 17V.

An example of a related art layer with uniform θ0 ("θ0 uniform layer") is illustrated in FIGS. 24A and 24B.

In the fourth embodiment, it is recognized that, with the θ0 variable layer 106, the same change in the contact angle θ, i.e., from 70 degrees to 112 degrees (the same change in the radius of curvature R) is achieved with a small voltage change (ΔV: 22V to lower than 17V). Formula Δθ0/Δθ=0.423 is given below Table 5.

As compared with the first embodiment of which wettability is changed linearly and which has similar Δθ0/θ0 to that of this embodiment, a characteristic change in the θ0 variable layer 106 is high on the high voltage side (i.e., the side of the non-electrolyte liquid) and thus V-θ sensitivity at low voltage regions is low.

Fifth Embodiment

Figure 8A:
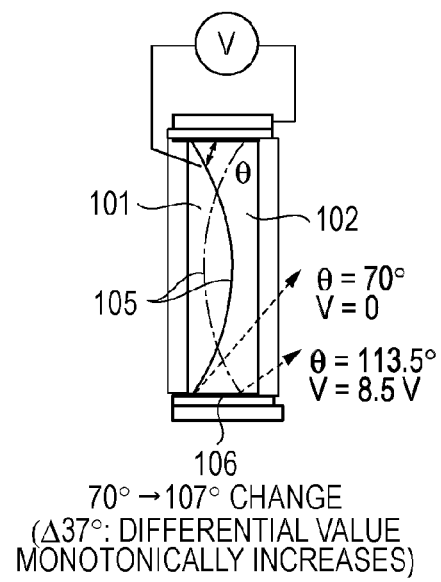
FIG. 8A is a schematic diagram of the liquid lens of a fifth embodiment (with a cylindrical electrode) according to the present invention.
Figure 8B:
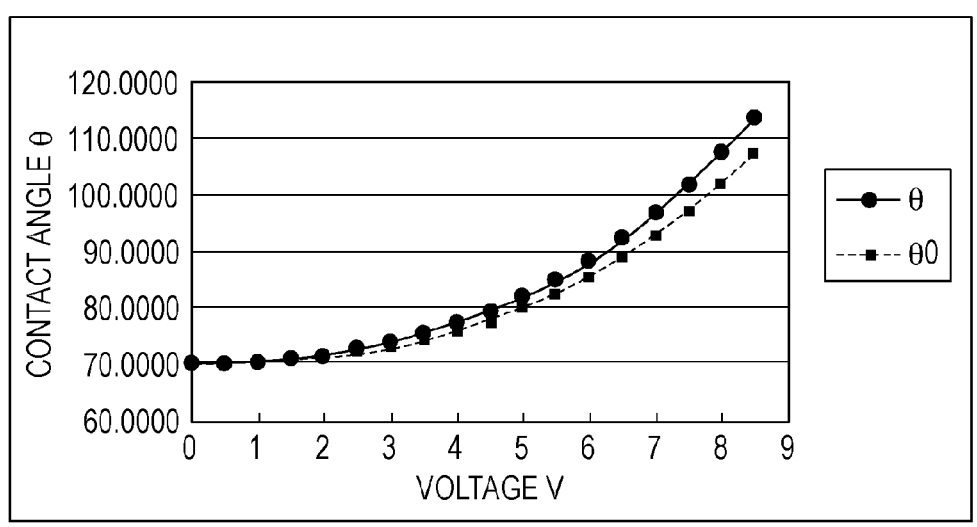
FIG. 8B is a V-θ graph.

FIG. 8A is a configuration diagram of the liquid lens according to the fifth embodiment (with a cylindrical electrode) and FIG. 8B is a V-θ characteristic graph. A V-θ characteristic table is given in Table 6.

The characteristic of a θ0 variable layer 106 will be described. Wettability of the θ0 variable layer 106 when an end of the interface 105 is situated closest to the electrolyte liquid 101 is 70 degrees (i.e., the initial contact angle θ0=θ00 at V=0). Wettability of the θ0 variable layer 106 when the end of the interface 105 is situated closest to the non-electrolyte liquid 102 (i.e., the initial contact angle θ0=θ0max at V=0) is increased to as large as 107 degrees (i.e., oleophobicity is increased). A change in wettability of the θ0 variable layer 106 differential monotonically increases from 70 degrees to 107 degrees as represented by a θ curve in FIG. 8B. The thickness of the insulating layer 103 below the θ0 variable layer 106, the dielectric constant of the insulating layer 103 and the interface energy γwo between the two liquids are the same as those of the first embodiment.

With this characteristic of the θ0 variable layer 106, an actual contact angle θ is changed from 70 degrees (θ=θ00) to 113.5 degrees (θ=θmax) (see the θ curve of FIG. 8B) when the applied voltage is increased from 0V to 8.5V.

An example of a related art layer with uniform θ0 ("θ0 uniform layer") is illustrated in FIGS. 24A and 24B.

In the fifth embodiment, it is recognized that, with the θ0 variable layer 106, the same change in the contact angle θ, i.e., from 70 degrees to 112 degrees (the same change in the radius of curvature R) is achieved with a small voltage change (ΔV: 22V to lower than 8.5V). Formula Δθ0/Δθ=0.850 is given below Table 6 of (C).

Since a change in Δθ0 in the θ0 variable layer 106 is larger than that of the fourth embodiment with the same monotonically increasing wettability (i.e., a change in wettability), the amount of the voltage change is small. As compared with the second embodiment of which wettability changes linearly and which has similar Δθ0/Δθ to that of this embodiment, V-θ sensitivity on the whole is substantially low.

Sixth Embodiment

Figure 9A:
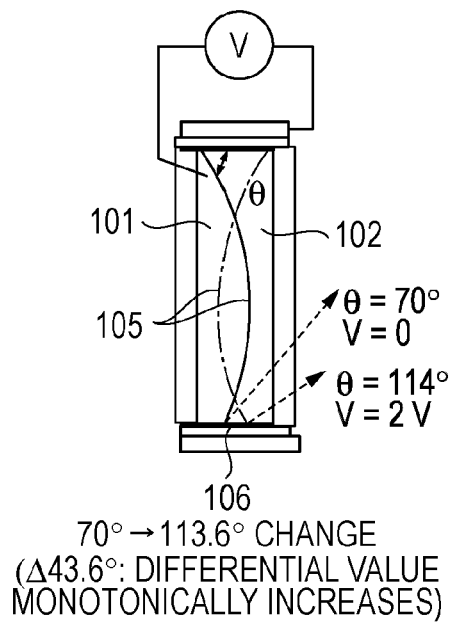
FIG. 9A is a schematic diagram of the liquid lens of a sixth embodiment (with a cylindrical electrode) according to the present invention.
Figure 9B:
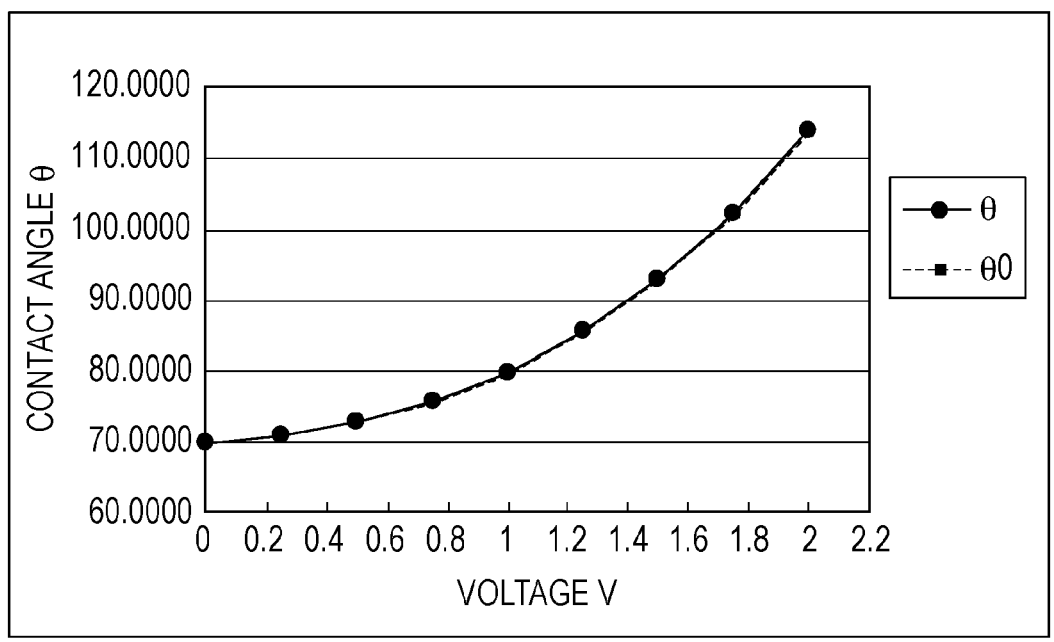
FIG. 9B is a V-θ graph.

FIG. 9A is a configuration diagram of the liquid lens according to the sixth embodiment (with a cylindrical electrode) and FIG. 9B is a V-θ characteristic graph. A V-θ characteristic table is given in Table 7.

The characteristic of a θ0 variable layer 106 will be described. Wettability of the θ0 variable layer 106 when an end of the interface 105 is situated closest to the electrolyte liquid 101 is 70 degrees (i.e., the initial contact angle θ0=θ00 at V=0). Wettability of the θ0 variable layer 106 when the end of the interface 105 is situated closest to the non-electrolyte liquid 102 (i.e., the initial contact angle θ0=θ0max at V=0) is increased to as large as 113.6 degrees (i.e., oleophobicity is increased). A change in wettability of the θ0 variable layer 106 differential monotonically increases from 70 degrees to 113.6 degrees as represented by a θ curve in FIG. 9B. The thickness of the insulating layer 103 below the θ0 variable layer 106, the dielectric constant of the insulating layer 103 and the interface energy γwo between the two liquids are the same as those of the first embodiment.

With this characteristic of the θ0 variable layer 106, an actual contact angle θ is changed from 70 degrees (θ=θ00) to 114 degrees (θ=θmax) (see the θ curve of FIG. 9B) when the applied voltage is increased from 0V to 2V.

An example of a related art layer with uniform θ0 ("θ0 uniform layer") is illustrated in FIGS. 24A and 24B.

In the sixth embodiment, it is recognized that, with the θ0 variable layer 106, the same change in the contact angle θ, i.e., from 70 degrees to 112 degrees (the same change in the radius of curvature R) is achieved with a small voltage change (ΔV: 22V to lower than 2V). Formula Δθ0/Δθ=0.992 is given below Table 4. Since a change in Δθ0 in the θ0 variable layer 106 (a change in wettability) is much larger than those of the fourth and fifth embodiments of which wettability monotonically increases in the same manner, θ in each position and the actual contact angle θ when voltage is applied is close to each other. Therefore substantially no voltage change is necessary. It is therefore possible to change power (from θ: 70 degrees to θ: 114 degrees) with a driving voltage of as small as 2V. As compared with the third embodiment which has similar high Δθ0/Δθ to that of this embodiment and of which wettability changes linearly, V-θ sensitivity on the whole is substantially low.

Consideration About First to Third Embodiments and Fourth to Sixth Embodiments

The fourth to sixth embodiments have wettability of the θ0 variable layer 106 which differential monotonically increases while the first to third embodiments have wettability which changes linearly. A linear change is generally suitable because V-θ sensitivity increases by about 80 percent of a range of the driving voltage.

Seventh Embodiment

Figure 10A:
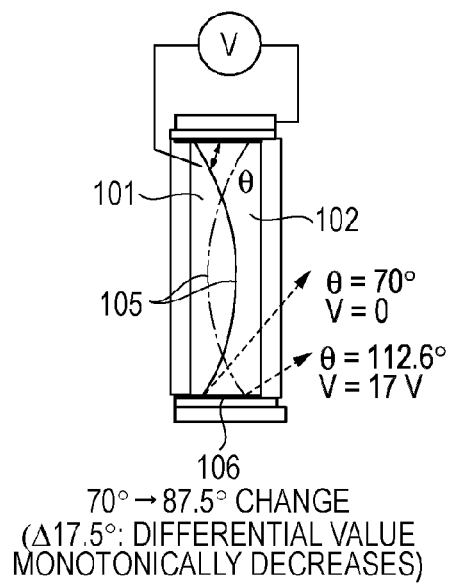
FIG. 10A is a schematic diagram of the liquid lens of a seventh embodiment (with a cylindrical electrode) according to the present invention.
Figure 10B:
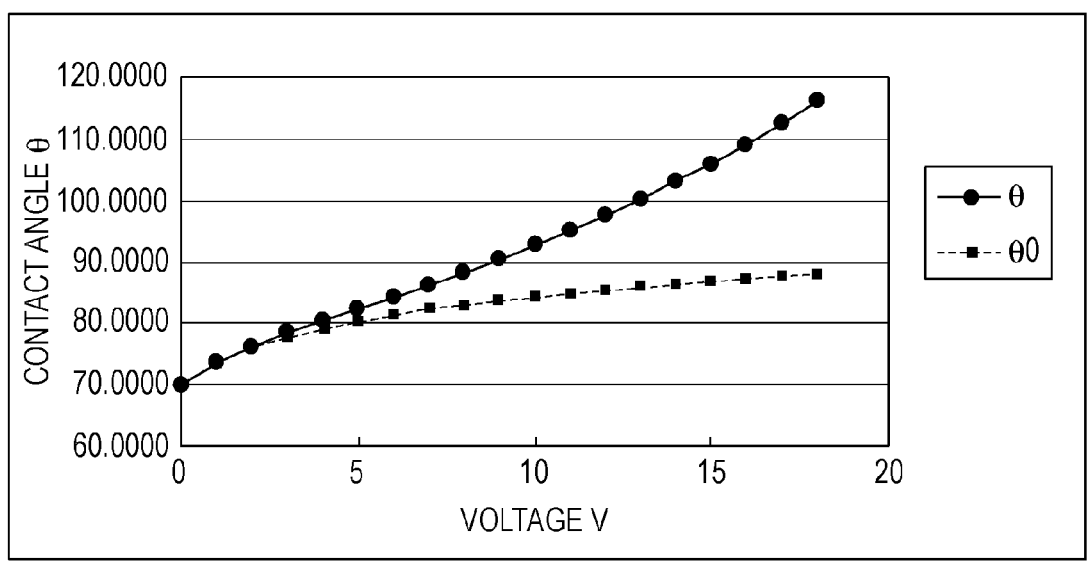
FIG. 10B is a V-θ graph.

FIG. 10A is a configuration diagram of the liquid lens according to the seventh embodiment (with a cylindrical electrode) and FIG. 10B is a V-θ characteristic graph. A V-θ characteristic table is given in Table 8.

The characteristic of a θ0 variable layer 106 will be described. Wettability of the θ0 variable layer 106 when an end of the interface 105 is situated closest to the electrolyte liquid 101 is 70 degrees (i.e., the initial contact angle θ0=θ00 at V=0). Wettability of the θ0 variable layer 106 when the end of the interface 105 is situated closest to the non-electrolyte liquid 102 (i.e., the initial contact angle θ0=θ0max at V=0) is increased to as large as 87.5 degrees (i.e., oleophobicity is increased). A change in wettability of the θ0 variable layer 106 differential monotonically decreases from 70 degrees to 87.5 degrees as represented by a θ curve in FIG. 10B. The thickness of the insulating layer 103 below the θ0 variable layer 106, the dielectric constant of the insulating layer 103 and the interface energy γwo between the two liquids are the same as those of the first embodiment.

With this characteristic of the θ0 variable layer 106, an actual contact angle θ is changed from 70 degrees (θ=θ00) to 112.6 degrees (θ=θmax) (see the θ curve of FIG. 10B) when the applied voltage is increased from 0V to 17V.

An example of a related art layer with uniform θ0 ("θ0 uniform layer") is illustrated in FIGS. 24A and 24B.

In the seventh embodiment, it is recognized that, with the θ0 variable layer 106, the same change in the contact angle θ, i.e., from 70 degrees to 112 degrees (the same change in the radius of curvature R) is achieved with a small voltage change (ΔV: 22V to 17V). Formula Δθ0/Δθ=0.410 is given below Table 8. As compared with the first embodiment of which wettability changes linearly and which has similar high Δθ0/Δθ to that of this embodiment, V-θ sensitivity on the whole is high.

Eighth Embodiment

Figure 11A:
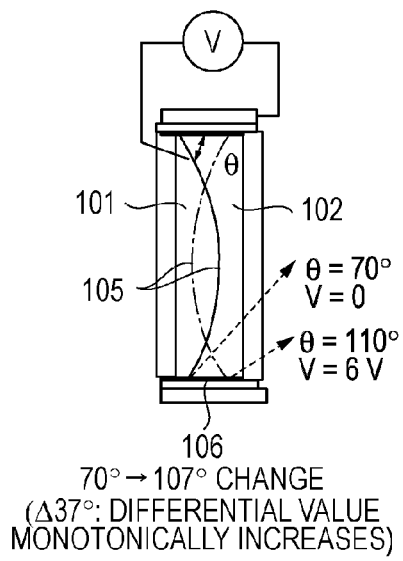
FIG. 11A is a schematic diagram of the liquid lens of an eighth embodiment (with a cylindrical electrode) according to the present invention.
Figure 11B:
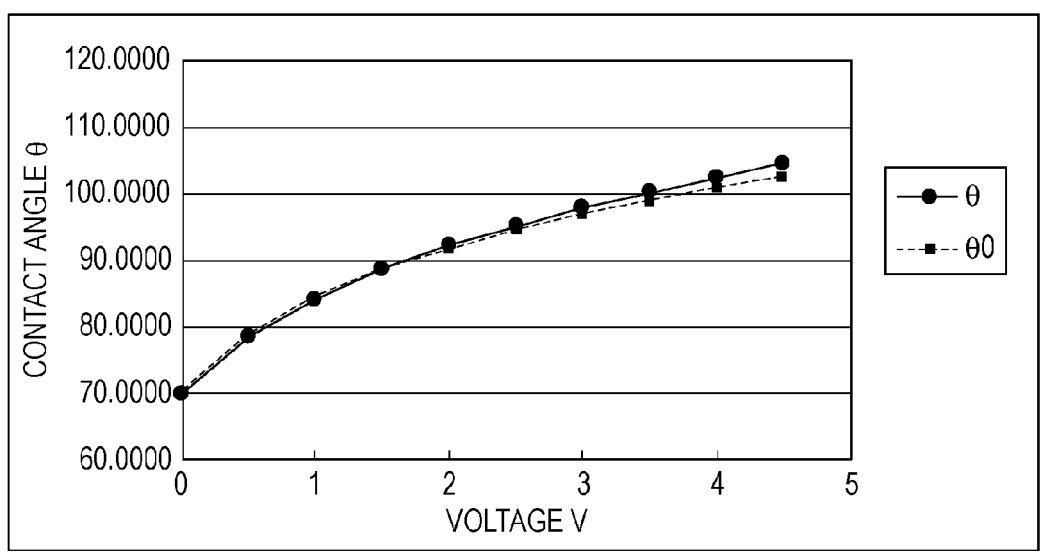
FIG. 11B is a V-θ graph.

FIG. 11A is a configuration diagram of the liquid lens according to the eighth embodiment (with a cylindrical electrode) and FIG. 11B is a V-θ characteristic graph. A V-θ characteristic table is given in Table 9.

The characteristic of a θ0 variable layer 106 will be described. Wettability of the θ0 variable layer 106 when an end of the interface 105 is situated closest to the electrolyte liquid 101 is 70 degrees (i.e., the initial contact angle θ0=θ00 at V=0). Wettability of the θ0 variable layer 106 when the end of the interface 105 is situated closest to the non-electrolyte liquid 102 (i.e., the initial contact angle θ0=θ0max at V=0) is increased to as large as 107.1 degrees (i.e., oleophobicity is increased). A change in wettability of the θ0 variable layer 106 differential monotonically increases from 70 degrees to 107.1 degrees as represented by a θ curve in FIG. 11B. The thickness of the insulating layer 103 below the θ0 variable layer 106, the dielectric constant of the insulating layer 103 and the interface energy γwo between the two liquids are the same as those of the first embodiment.

With this characteristic of the θ0 variable layer 106, an actual contact angle θ is changed from 70 degrees (θ=θ00) to 110.3 degrees (θ=θmax) (see the θ curve of FIG. 11B) when the applied voltage is increased from 0V to 6V.

An example of a related art layer with uniform θ0 ("θ0 uniform layer") is illustrated in FIGS. 24A and 24B.

In the eighth embodiment, it is recognized that, with the θ0 variable layer 106, the same change in the contact angle θ, i.e., from 70 degrees to 112 degrees (the same change in the radius of curvature R) is achieved with a small voltage change (ΔV: 22V to about 6V). Formula Δθ0/Δθ=0.920 is given below Table 9.

Since a change in Δθ0 in the θ0 variable layer 106 is larger than that of the seventh embodiment with the same monotonically decreasing wettability (i.e., a change in wettability), the amount of the voltage change is small. As compared with the second embodiment of which wettability changes linearly and which has similar Δθ0/Δθ to that of this embodiment, V-θ sensitivity on the whole is substantially high.

Ninth Embodiment

Figure 12A:
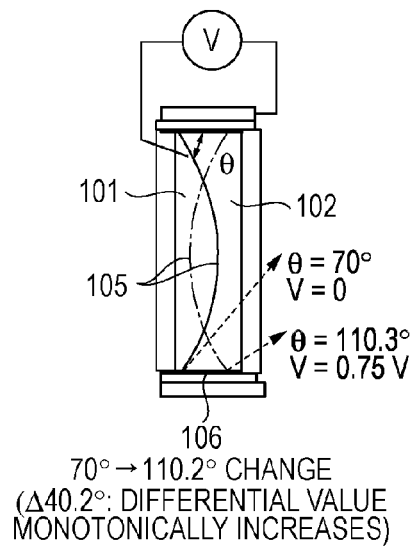
FIG. 12A is a schematic diagram of the liquid lens of a ninth embodiment (with a cylindrical electrode) according to the present invention.
Figure 12B:
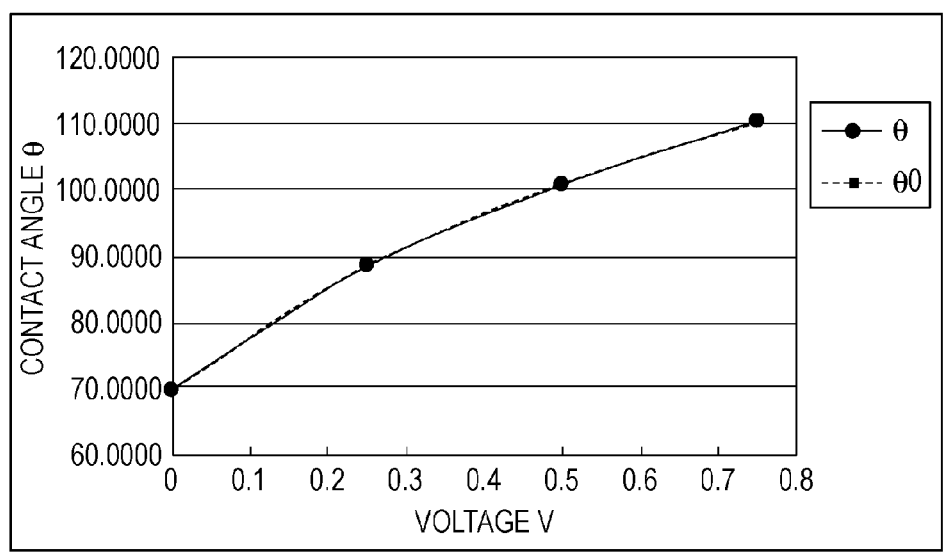
FIG. 12B is a V-θ graph.

FIG. 12A is a configuration diagram of the liquid lens according to the ninth embodiment (with a cylindrical electrode) and FIG. 12B is a V-θ characteristic graph. A V-θ characteristic table is given in Table 10.

The characteristic of a θ0 variable layer 106 will be described. Wettability of the θ0 variable layer 106 when an end of the interface 105 is situated closest to the electrolyte liquid 101 is 70 degrees (i.e., the initial contact angle θ0=θ00 at V=0). Wettability of the θ0 variable layer 106 when the end of the interface 105 is situated closest to the non-electrolyte liquid 102 (i.e., the initial contact angle θ0=θ0max at V=0) is increased to as large as 110.2 degrees (i.e., oleophobicity is increased).

A change in wettability of the θ0 variable layer 106 differential monotonically decreases from 70 degrees to 110.3 degrees as represented by a θ curve in FIG. 12B. The thickness of the insulating layer 103 below the θ0 variable layer 106, the dielectric constant of the insulating layer 103 and the interface energy γwo between the two liquids are the same as those of the first embodiment.

With this characteristic of the θ0 variable layer 106, an actual contact angle θ is changed from 70 degrees (θ=θ00) to 110.3 degrees (θ=θmax) (see the θ curve of FIG. 12B) when the applied voltage is increased from 0V to 0.75V.

An example of a related art layer with uniform θ0 ("θ0 uniform layer") is illustrated in FIGS. 24A and 24B.

In the ninth embodiment, it is recognized that, with the θ0 variable layer 106, the same change in the contact angle θ, i.e., from 70 degrees to 112 degrees (the same change in the radius of curvature R) is achieved with a small voltage change (ΔV: 22V to about 0.75V). Formula Δθ0/Δθ=0.999 is given below Table 10.

Since a change in Δθ0 in the θ0 variable layer 106 (a change in wettability) is much larger than those of the sixth and eighth embodiments of which wettability monotonically decreases in the same manner, θ in each position and the actual contact angle θ when voltage is applied is close to each other. Therefore substantially no voltage change is necessary. It is therefore possible to change power (from θ: 70 degrees to θ: 110.3 degrees) with a driving voltage of as small as 0.75V. As compared with the third embodiment which has similar high Δθ0/Δθ to that of this embodiment and of which wettability changes linearly, V-θ sensitivity on the whole is further high.

Consideration About First to Third Embodiments, Fourth to Sixth Embodiments and Seventh to Ninth Embodiments The seventh to ninth embodiments have wettability of the θ0 variable layer 106 which differential monotonically decreases while the first to third embodiments have wettability which changes linearly. The seventh to ninth embodiments have higher V-θ sensitivity than those embodiments with linearly changing wettability. Regarding a degree of V-θ sensitivity, the differential monotonical decrease is the highest, the differential monotonical increase is the lowest and the linear change is therebetween; among these, the differential monotonical decrease is the most suitable.

Tenth Embodiment

Figure 13A:
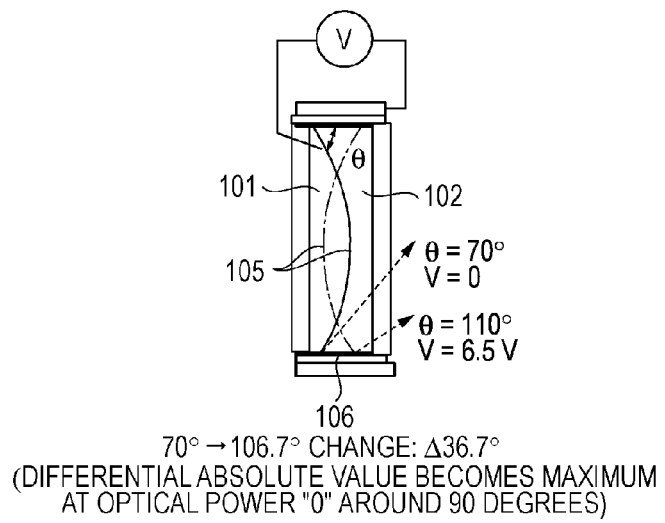
FIG. 13A is a schematic diagram of the liquid lens of a tenth embodiment (with a cylindrical electrode) according to the present invention.
Figure 13B:
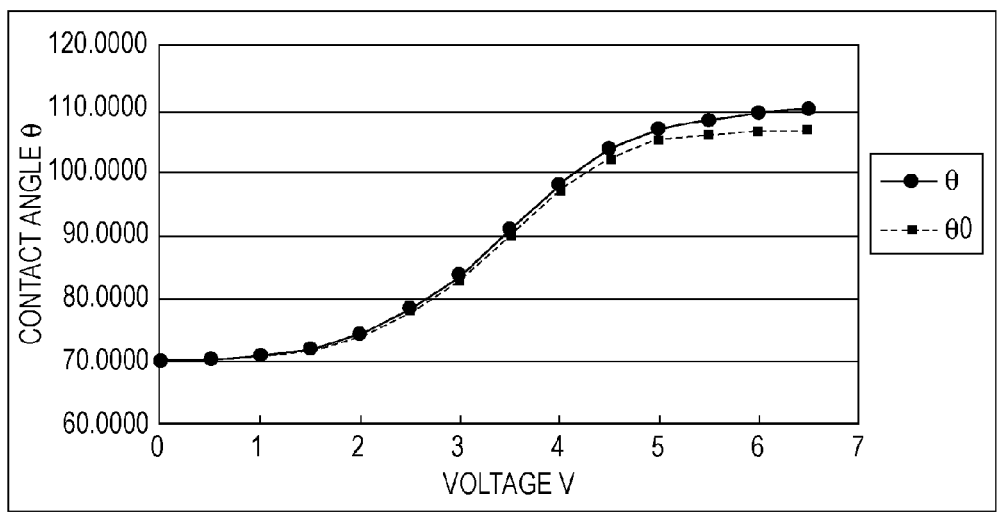
FIG. 13B is a V-θ graph.

FIG. 13A is a configuration diagram of the liquid lens according to the tenth embodiment (with a cylindrical electrode) and FIG. 13B is a V-θ characteristic graph. A V-θ characteristic table is given in Table 11.

The characteristic of a θ0 variable layer 106 will be described. Wettability of the θ0 variable layer 106 when an end of the interface 105 is situated closest to the electrolyte liquid 101 is 70 degrees (i.e., the initial contact angle θ0=θ00 at V=0). Wettability of the θ0 variable layer 106 when the end of the interface 105 is situated closest to the non-electrolyte liquid 102 (i.e., the initial contact angle θ0=θ0max at V=0) is increased to as large as 106.7 degrees (i.e., oleophobicity is increased). In the range of the change in wettability of the θ0 variable layer 106 is 70 degrees to 106.7 degrees as represented by the θ0 curve of (B) in FIG. 13B, sensitivity to the change in wettability of the θ0 variable layer 106 is low in a low voltage region and a high voltage region and high in a middle voltage region.

The thickness d of the insulating layer 103 below the θ0 variable layer 106 is represented by d=1.300E-03 mm, the dielectric constant ∈ of the insulating layer 103 is represented by ∈=3.9E-11 F/m and the interface energy between the two liquids γwo is represented by γwo=1.141e-5 kN/m. With this characteristic of the θ0 variable layer 106, an actual contact angle θ is changed from 70 degrees (θ=θ00) to 110.1 degrees (θ=θmax) (see the θ curve of FIG. 13B) when the applied voltage is increased from 0V to 6.5V.

Although not illustrated, in a related art example with uniform θ0 ("θ0 uniform layer"), a voltage V is changed from 0V to 23V and the contact angle θ is changed from 70 degrees to 110.7 degrees (θ0 is always 70 degrees). It is therefore recognized that, with the θ0 variable layer 106, the same change in the contact angle θ, i.e., from 70 degrees to 110 degrees (the same change in the radius of curvature R) is achieved with a small voltage change (ΔV: 23V to 6.5V). Formula Δθ0/Δθ=0.916 is given below Table 11.

If a lens unit is formed as a combination of a liquid lens and a common lens (i.e., a lens made of solid material, such as glass, plastic, quartz or the like) and the liquid lens is used for focusing or zooming, optical performance of the entire lens unit is hardly affected when the liquid lens has the refractive power about "0" even if V-θ varies due to an error.

However, in regions of the liquid lens with the increased positive or negative refractive power, even a slight variation in V-θ correspondence due to error significantly impairs the optical performance of the entire lens unit.

In the tenth embodiment, the negative power of the liquid lens becomes the largest when the contact angle θ is 70 degrees (an interface at this time is represented by a solid line), the refractive power of the liquid lens is "0" when the contact angle θ is 90 degrees and the positive power of the liquid lens becomes the largest when the contact angle θ is 110 degrees (an interface at this time is represented by a dotted line).

Then, a minute change in the voltage V applied by the voltage applying unit is set to dV in the vicinity of regions where the refractive power is "0" when the contact angle θ is 90 degrees (i.e., the contact angle θ is within ±7 degrees) and a minute change in this θ0 when the contact angle on the side of the non-electrolyte liquid between the interface and the inner wall which are in contact with each other which are in contact with each other is θ0 under no voltage application is set to dθ0. Under this condition, dθ0/dV (i.e., the differential absolute value) becomes the maximum and V-θ sensitivity is enhanced and varied largely to increase the speed. In the regions where the contact angle θ is about 70 degrees and 110 degrees (i.e., the contact angle is within θ±7) and the refractive power is large, a minute change in the voltage V applied by the voltage applying unit is set to dV and a minute change in this θ0 when the contact angle on the side of the non-electrolyte liquid between the interface and the inner wall which are in contact with each other is θ0 under no voltage application is set to dθ0. Under this condition, dθ0/dV (i.e., the differential absolute value) becomes the minimum. If V-θ sensitivity is decreased to be varied slightly and V-θ correspondence is controlled highly accurately, the quality of lens can be enhanced.

Eleventh Embodiment

Figure 14A:
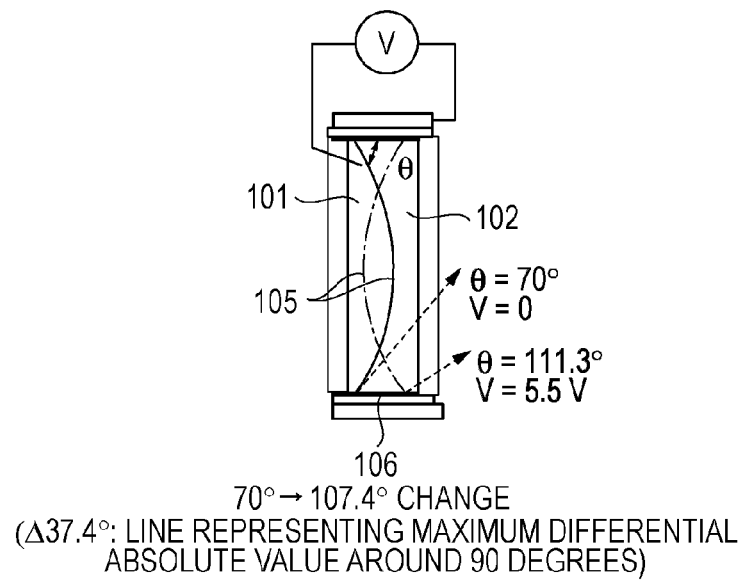
FIG. 14A is a schematic diagram of the liquid lens of an eleventh embodiment (with a cylindrical electrode) according to the present invention.
Figure 14B:
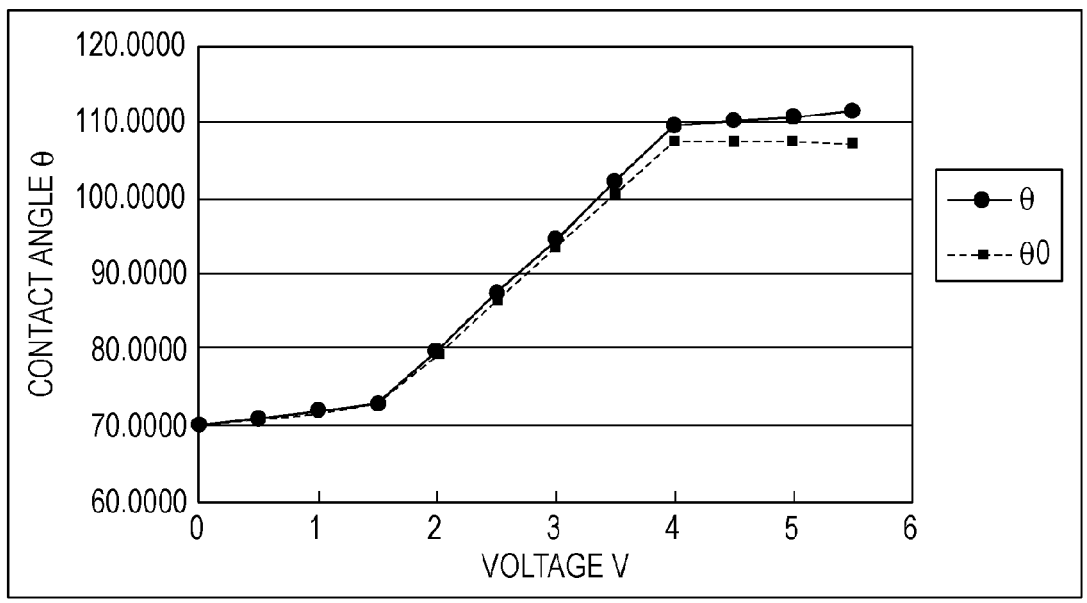
FIG. 14B is a V-θ graph.

FIG. 14A is a configuration diagram of the liquid lens according to the eleventh embodiment (with a cylindrical electrode) and FIG. 14B is a V-θ characteristic graph. A V-θ characteristic table (C) is given in Table 12.

The characteristic of a θ0 variable layer 106 will be described. Wettability of the θ0 variable layer 106 when an end of the interface 105 is situated closest to the electrolyte liquid 101 is 70 degrees (i.e., the initial contact angle θ0=θ00 at V=0). Wettability of the θ0 variable layer 106 when the end of the interface 105 is situated closest to the non-electrolyte liquid 102 (i.e., the initial contact angle θ0=θ0max at V=0) is increased to as large as 107.4 degrees (i.e., oleophobicity is increased).

In the range of the change in wettability of the θ0 variable layer 106 is 70 degrees to 107.4 degrees as represented by the θ0 line of the graph in FIG. 14B, sensitivity to the change in wettability of the θ0 variable layer 106 is low in a low voltage region and a high voltage region and high in a middle voltage region.

The thickness d of the insulating layer 103 below the θ0 variable layer 106 is represented by d=7.00E-04 mm, the dielectric constant ∈ of the insulating layer 103 is represented by ∈=1.82E-11 F/m and the interface energy between the two liquids γwo is represented by γwo=6.1461e-6 kN/m. With this characteristic of the θ0 variable layer 106, an actual contact angle θ is changed from 70 degrees (θ=θ00) to 111.3 degrees (θ=θmax) (see the θ line of FIG. 14B) when the applied voltage is increased from 0V to 5.5V.

Although not illustrated, in a related art example with uniform θ0 ("θ0 uniform layer"), a voltage V is changed from 0V to 18V and the contact angle θ is changed from 70 degrees to 110.1 degrees (θ0 is always 70 degrees).

It is therefore recognized that, with the θ0 variable layer 106, the same change in the contact angle θ, i.e., from 70 degrees to 110 degrees (the same change in the radius of curvature R) is achieved with a small voltage change (ΔV: 18V to 5.5V). Formula Δθ0/Δθ=0.906 is given below Table 12.

In the eleventh embodiment, as in the tenth embodiment, the negative power of the liquid lens becomes highest at the contact angle θ=70 degrees (the interface is represented by a solid line), the refractive power of the liquid lens is "0" when the contact angle is θ=90, and the positive power of the liquid lens becomes highest at the contact angle θ=110 degrees (the interface is represented by a dotted line).

The θ0 variable layer is provided with a characteristic such that sensitivity to the change in wettability increases linearly (i.e., the rate of change in oleophobicity is high) in the vicinity of regions where the refractive power is "0" when the contact angle θ is 90 degrees (i.e., the contact angle θ is within ±7 degrees) and a minute change in the voltage V applied by the voltage applying unit is set to dV, and a minute change in this θ0 when the contact angle on the side of the non-electrolyte liquid between the interface and the inner wall which are in contact with each other is θ0 under no voltage application is set to dθ0. Under this condition, dθ0/dV (i.e., the differential absolute value) becomes the maximum and V-θ sensitivity is enhanced and varied largely to increase the speed.

The θ0 variable layer is provided with a characteristic such that sensitivity to the change in wettability decreases linearly (i.e., the rate of change in oleophobicity is low) in the vicinity of regions where the contact angle θ is 70 degrees and 110 degrees (i.e., the contact angle θ is within ±7 degrees) where the power is high, a minute change in the voltage V applied by the voltage applying unit is set to dV, and a minute change in this θ0 when the contact angle on the side of the non-electrolyte liquid between the interface and the inner wall which are in contact with each other is θ0 under no voltage application is set to θ0. Under this condition, dθ0/dV (i.e., the differential absolute value) becomes the minimum. V-θ sensitivity is decreased to be varied slightly and V-θ is controlled highly accurately, thus the quality of lens is enhanced.

The θ0 line in FIG. 14B represents a linear change in three regions (i.e., an inclination is greater in the vicinity of the region with the refractive power of 0 and is smaller in other regions). It is therefore possible to manufacture the θ0 variable layer in an easier manner than that in the tenth embodiment which has a continuous curve.

Twelfth Embodiment and Second Comparative Embodiment

Figure 15A:
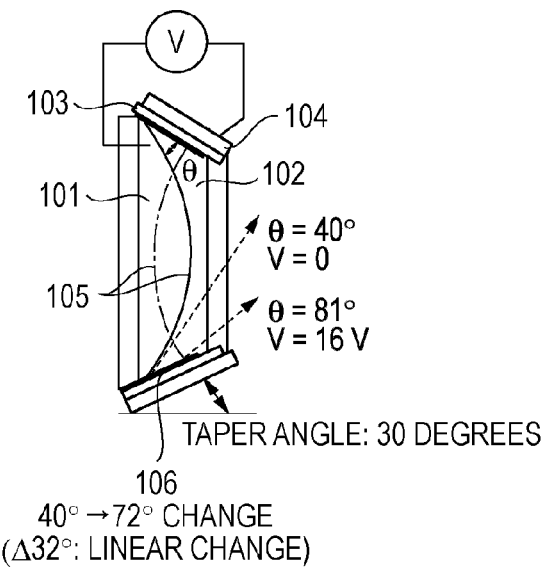
FIG. 15A is a schematic diagram of the liquid lens of a twentieth embodiment (with a cylindrical taper electrode) according to the present invention.
Figure 15B:
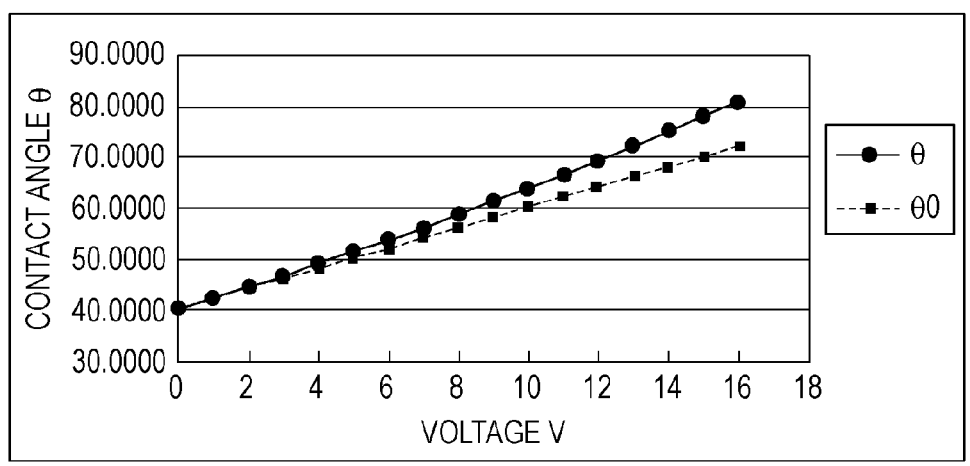
FIG. 15B is a V-θ graph.

FIG. 15A is a configuration diagram of the liquid lens according to the twelfth embodiment (with a cylindrical taper electrode) and FIG. 15B is a V-θ characteristic graph. A V-θ characteristic table is given in Table 13. The taper angle α is 30 degrees.

The characteristic of a θ0 variable layer 106 will be described. Wettability of the θ0 variable layer 106 when the end of the interface 105 is situated closest to the electrolyte liquid 101 is 40 degrees (i.e., the initial contact angle θ0 is θ00 at V=0). Wettability of the θ0 variable layer 106 when the end of the interface 105 is situated closest to the non-electrolyte liquid 102 (i.e., the initial contact angle θ0=θ0max at V=0) is increased to as large as 72 degrees (i.e., oleophobicity is increased).

Wettability of the θ0 variable layer 106 is changed linearly from 40 degrees to 72 degrees as represented by the θ curve in FIG. 15B (see the θ0 curve of the graph in FIG. 15B). The thickness d of the insulating layer 103 below the θ0 variable layer 106 is represented by d=1.20E-03 mm, the dielectric constant ∈ of the insulating layer 103 is represented by ∈=2.5E-11 F/m and the interface energy between the two liquids γwo is represented by γwo=1.756e-5 kN/m. With this characteristic of the θ0 variable layer 106, an actual contact angle θ is changed from 40 degrees (θ=θ00) to 81.0 degrees (θ=θmax) (see the θ curve of FIG. 15B) when the applied voltage is increased from 0V to 16V.

Figure 25A:
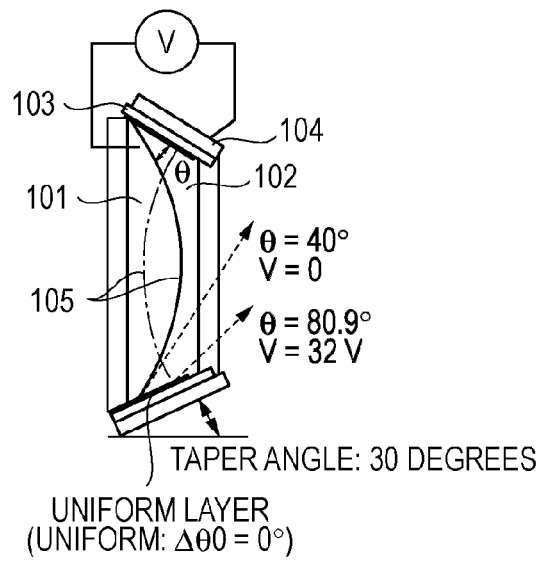
FIG. 25A is a schematic diagram of a related art liquid lens (with a cylindrical taper electrode).
Figure 25B:
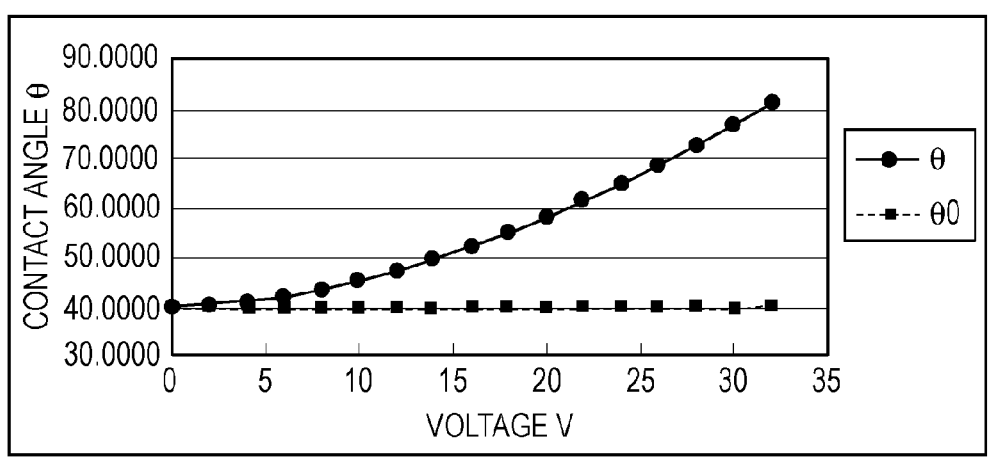
FIG. 25B is a V-θ graph.

FIGS. 25A and 25B illustrate a liquid lens of the second comparative embodiment which incorporates a related art θ0 uniform layer with uniform θ0 in place of the θ0 variable layer 106 for comparison with the cylindrical taper electrode. FIG. 25A is a configuration diagram and FIG. 25B is a V-θ characteristic graph. A V-θ characteristic table of the second comparative embodiment is given in Table 14.

When the driving voltage in a range of 0V to 32V is applied, θ is changed from the contact angle θ=40 degrees (θ0 is also 40 degrees) at V=0 where the end of the interface 105 is situated closest to the electrolyte liquid 101 to the contact angle θ=80.9 degrees where the end of the interface 105 is situated closest to the non-electrolyte liquid 102. The graph of FIG. 25B represents a θ curve from 40 degrees to 80.9 degrees. The θ0 curve indicates that there is no change in θ0.

The taper angle, the thickness and the dielectric constant of the insulating layer 103 and the interface energy between the two liquids are the same as those of the twelfth embodiment of the present embodiment.

In the twelfth embodiment, it is recognized that, with the θ0 variable layer 106, the same change in the contact angle θ, i.e., from 40 degrees to 81 degrees (the same change in the radius of curvature R) is achieved with a small voltage change (ΔV: 32V to 16V). Formula Δθ0/Δθ0=0.781 is given below Table 13.

Thirteenth Embodiment

Figure 16A:
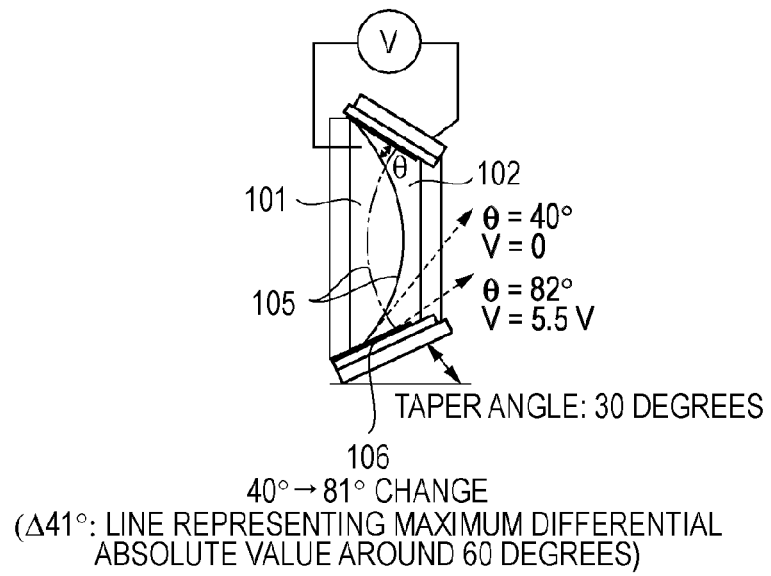
FIG. 16A is a schematic diagram of the liquid lens of a thirteenth embodiment (with a cylindrical taper electrode) according to the present invention.
Figure 16B:
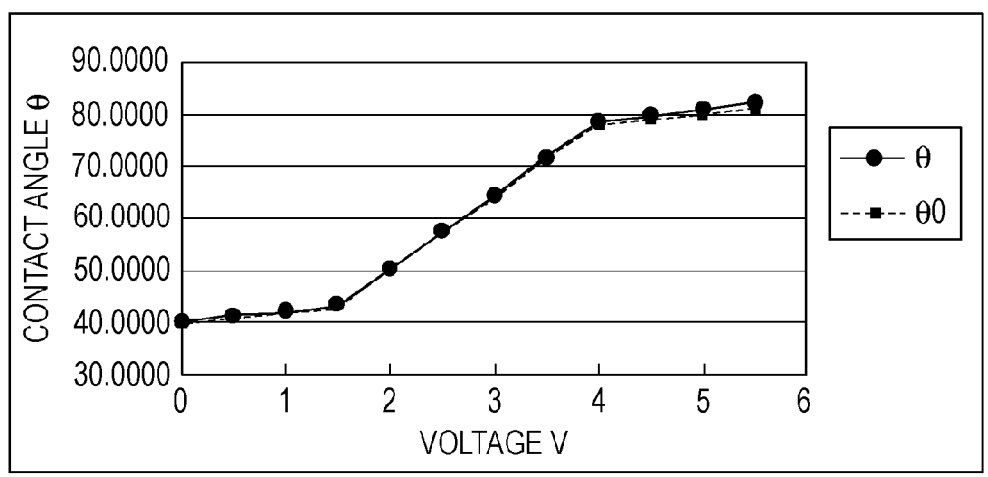
FIG. 16B is a V-θ graph.

FIG. 16A is a configuration diagram of the liquid lens according to the thirteenth embodiment (with a cylindrical taper electrode) and FIG. 16B is a V-θ characteristic graph. A V-θ characteristic table (C) is given in Table 15.

The taper angle α is 30 degrees which is the same in the twelfth embodiment.

The characteristic of a θ0 variable layer 106 will be described. Wettability of the θ0 variable layer 106 when the end of the interface 105 is situated closest to the electrolyte liquid 101 is 40 degrees (i.e., the initial contact angle θ0 is θ00 at V=0). Wettability of the θ0 variable layer 106 when the end of the interface 105 is situated closest to the non-electrolyte liquid 102 (i.e., the initial contact angle θ0=θ0max at V=0) is increased to as large as 81 degrees (i.e., oleophobicity is increased). In the range of the change in wettability of the θ0 variable layer 106 is 40 degrees to 81 degrees as represented by the θ0 curve of the graph in FIG. 16B, sensitivity to the change in wettability is low in a low voltage region and a high voltage region and high in a middle voltage region. The thickness of the insulating layer 103 below the θ0 variable layer 106, the dielectric constant of the insulating layer 103 and the interface energy between the two liquids are the same as those of the twelfth embodiment. With this characteristic of the θ0 variable layer 106, an actual contact angle θ is changed from 40 degrees (θ=θ00) to 82 degrees (θ=θmax) (see the θ line of FIG. 16B) when the applied voltage is increased from 0V to 5.5V.

An example of a related art layer with uniform θ0 ("θ0 uniform layer") with a cylindrical taper electrode is illustrated in FIGS. 25A and 25B.

In the thirteenth embodiment, it is recognized that, with the θ0 variable layer 106, the same change in the contact angle θ, i.e., from 40 degrees to 81 degrees (the same change in the radius of curvature R) is achieved with a small voltage change (ΔV: 32V to lower than 5.5V). Formula Δθ0/Δθ=0.975 is given below Table 15.

In the thirteen embodiment, as in the eleventh embodiment, the characteristic of the change in wettability is represented by a line (see graph in FIG. 16B).

The negative power of the liquid lens becomes the largest when the contact angle θ is 40 degrees (an interface at this time is represented by a solid line), the refractive power of the liquid lens is "0" when the contact angle is θ=60, and the positive power of the liquid lens becomes the largest when the contact angle θ is 82 degrees (an interface at this time is represented by a dotted line).

The θ0 variable layer is provided with a characteristic such that sensitivity to the change in wettability increases linearly (i.e., the rate of change in oleophobicity is high) in the vicinity of regions where the power is "0" (i.e., the contact angle θ is within ±7 degrees) when the contact angle θ is 60 degrees a minute change in the voltage V applied by the voltage applying unit is set to dV, and a minute change in this θ0 when the contact angle on the side of the non-electrolyte liquid between the interface and the inner wall which are in contact with each other is θ0 under no voltage application is set to dθ0. Under this condition, dθ0/dV (i.e., the differential absolute value) becomes the maximum and V-θ sensitivity is enhanced and varied largely to increase the speed.

The θ0 variable layer is provided with a characteristic such that sensitivity to the change in wettability decreases linearly (i.e., the rate of change in oleophobicity is low) in the vicinity of regions where the contact angle θ is 40 degrees and 82 degrees (i.e., the contact angle θ is within ±7 degrees) where the power is high.

Then a minute change in the voltage V applied by the voltage applying unit is set to dV, and a minute change in this θ0 when the contact angle on the side of the non-electrolyte liquid between the interface and the inner wall which are in contact with each other is θ0 under no voltage application is set to dθ0. Under this condition, dθ0/dV (i.e., the differential absolute value) becomes the minimum. V-θ sensitivity is decreased to be varied slightly and V-θ is controlled highly accurately, thus the quality of lens is enhanced. The θ0 line in FIG. 16B represents a linear change in three regions (i.e., an inclination is greater in the vicinity of the region with the refractive power of 0 and is smaller in other regions). It is therefore possible to manufacture the θ0 variable layer in an easier manner than that in the tenth embodiment which has a continuous curve.

Fourteenth Embodiment

Figure 17A:
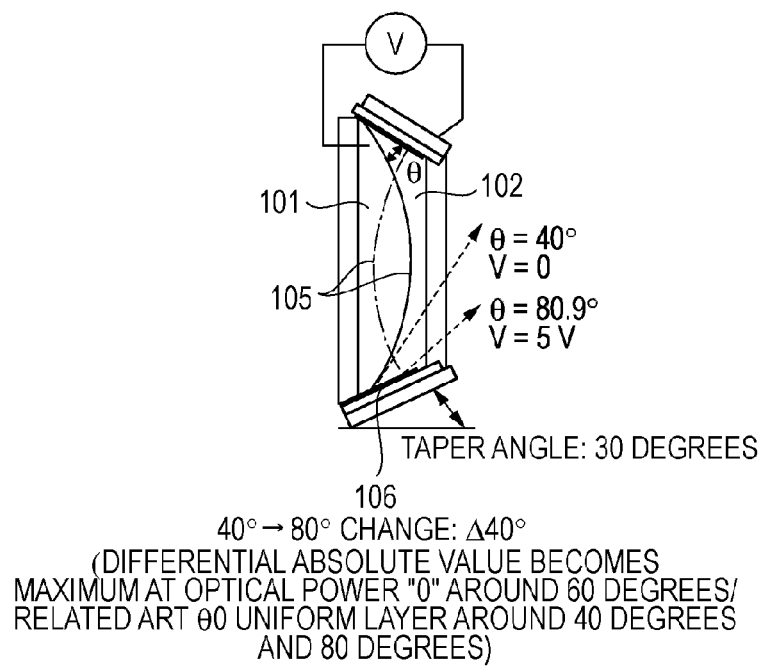
FIG. 17A is a schematic diagram of the liquid lens of a fourteenth embodiment (with a cylindrical taper electrode) according to the present invention.
Figure 17B:
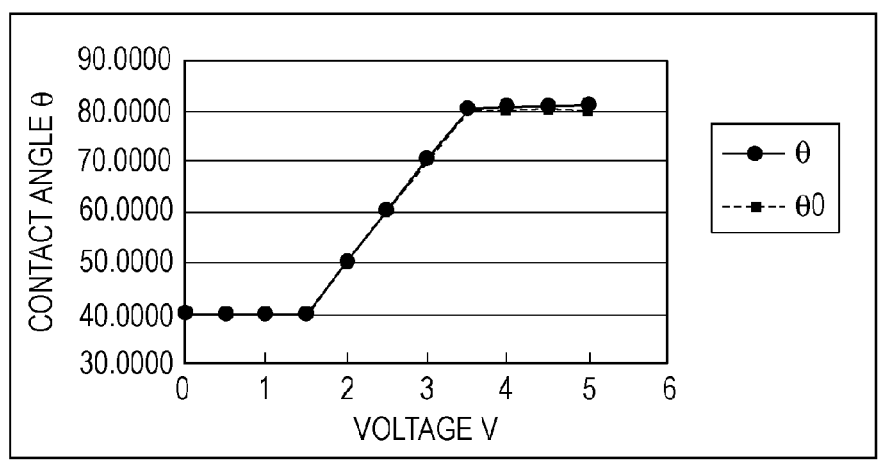
FIG. 17B is a V-θ graph.

FIG. 17A is a configuration diagram of the liquid lens according to the fourteenth embodiment (with a cylindrical taper electrode) and FIG. 17B is a V-θ characteristic graph. A V-θ characteristic table is given in Table 16.

The taper angle α is 30 degrees which is the same in the twelfth embodiment.

The characteristic of a θ0 variable layer 106 will be described. Wettability of the θ0 variable layer 106 when the end of the interface 105 is situated closest to the electrolyte liquid 101 is 40 degrees (i.e., the initial contact angle θ0 is θ00 at V=0). Wettability of the θ0 variable layer 106 when the end of the interface 105 is situated closest to the non-electrolyte liquid 102 (i.e., the initial contact angle θ0=θ0max at V=0) is increased to as large as 80 degrees (i.e., oleophobicity is incθeased). In the range of the change in wettability of the θ0 variable layer 106 is 40 degrees to 80 degrees as represented by the θ0 curve of the graph in FIG. 17B. The θ0 uniform layer (θ0=40 degrees) is used in the range of V=0V to 1.5V; the θ0 variable layer (θ0 linearly changes from 40 degrees to 80 degrees) is used in the range of V=1.5V to 3.5V; and the θ0 uniform layer (θ0=40 degrees) is used in the range of V=3.5V to 5V. The thickness of the insulating layer 103 below the θ0 variable layer 106, the dielectric constant of the insulating layer 103 and the interface energy between the two liquids are the same as those of the twelfth and thirteenth embodiments. With this characteristic of the θ0 variable layer 106, an actual contact angle θ is changed from 40 degrees (θ=θ00) to 80.9 degrees (θ=θmax) (see the θ line of FIG. 16B) when the applied voltage is increased from 0V to 5V.

An example of a related art layer with uniform θ0 ("θ0 uniform layer") with a cylindrical taper electrode is illustrated in FIGS. 25A and 25B.

In the fourteenth embodiment, it is recognized that, with the θ0 variable layer 106, the same change in the contact angle θ, i.e., from 40 degrees to 80.9 degrees (the same change in the radius of curvature R) is achieved with a small voltage change (ΔV: 32V to less than 5V). Formula Δθ0/Δθ=0.979 is given below Table of (C).

In the fourteen embodiment, as in the eleventh and thirteenth embodiments, the characteristic of the change in wettability is represented by a line (see graph in FIG. 17B). The negative power of the liquid lens becomes the largest when the contact angle θ is 40 degrees (an interface at this time is represented by a solid line), the refractive power of the liquid lens is "0" when the contact angle is θ=60, and the positive power of the liquid lens becomes the largest when the contact angle θ is 80.9 degrees (an interface at this time is represented by a dotted line). The θ0 variable layer is provided with a characteristic such that sensitivity to the change in wettability increases linearly (i.e., the rate of change in oleophobicity is high) in the vicinity of regions where the power is "0" (i.e., the contact angle θ is within ±7 degrees) when the contact angle θ is 60 degrees, a minute change in the voltage V applied by the voltage applying unit is set to dV, and a minute change in this θ0 when the contact angle on the side of the non-electrolyte liquid between the interface and the inner wall which are in contact with each other is θ0 under no voltage application is set to dθ0. Under this condition, dθ0/dV (i.e., the differential absolute value) becomes the maximum and V-θ sensitivity is enhanced and varied largely to increase the speed.

A related art θ0 uniform layer with no sensitivity to the change in wettability is used in the vicinity of regions where the contact angle θ is 40 degrees and 80.9 degrees (i.e., within the contact angle θ±7 degrees) where the power is high, a minute change in the voltage V applied by the voltage applying unit is set to dV, and a minute change in this θ0 when the contact angle on the side of the non-electrolyte liquid between the interface and the inner wall which are in contact with each other is θ0 under no voltage application is set to θ0. Under this condition, dθ0/dV (i.e., the differential absolute value) becomes the minimum and the V-θ sensitivity is significantly reduced. This is effective when fine θ control around this region is necessary. Since the line has three regions and both end regions are θ0 uniform layers, the liquid lens is manufactured further easily.

Figure 18:
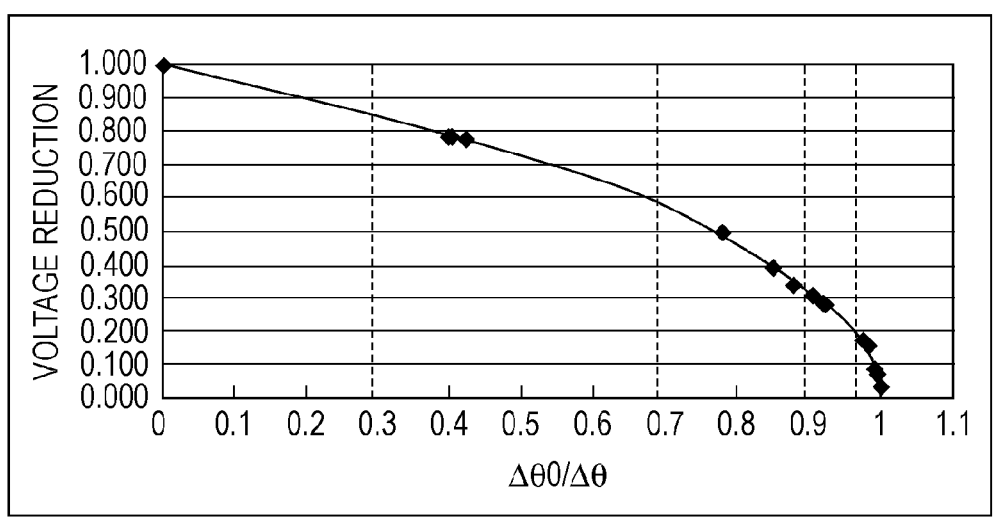
FIG. 18 is a graph illustrating a relationship between a characteristic of a θ0 variable layer and reduction in an applied voltage in the embodiment according to the present invention.

Consideration About First to Fourteenth Embodiments and First and Second Comparative Embodiments In FIG. 18 and Table 17, a relationship between Δθ0/Δθ and the ratio of reduction in the driving voltage Vh/Vk in the fourteen embodiments and two comparative embodiments is described.

$$\Delta\theta = \theta max - \theta 00$$

$$\Delta\theta 0 = \theta 0 max - \theta 00$$

In a movable range of the interface 105, the largest contact angle (on the side of the non-electrolyte liquid 102) is set to θmax (i.e., the maximum value of the contact angle) and the contact angle under no voltage application representing wettability of the layer at the point (i.e., the θ0 variable layer 106) is set to θ0max. When V=0, i.e., no voltage is applied, the contact angle θ with the interface 105 situated closest to the electrolyte liquid 101 (i.e., on the non-electrolyte liquid 102) is set to θ0 (θ=θ0, the initial contact angle).

Generally, an increase in applied voltage leads to an increased contact angle θ. Accordingly, θmax is a value of the highest applied voltage and the end of the interface has been moved to a position closest to the non-electrolyte liquid.

θ00 (i.e., θ=θ0), on the other hand, is a value when the applied voltage value V is 0 and the end of the interface has been situated closest to the electrolyte liquid. Herein, the characteristic of the θ0 variable layer is determined such that oleophobicity becomes high, i.e., wettability (contact angle θ0 when V=0) is progressively increased toward the non-electrolyte liquid from the electrolyte liquid. Vh is a value of the driving voltage when the θ0 variable layer is used and the contact angle θ is θmax. Vk is a value of the driving voltage when the related art θ0 uniform layer is used and the contact angle θ is θmax. The characteristic of the following conditional formula is understood from the graph of FIG. 18.

$$\Delta\theta 0/\Delta\theta > 0.3$$

A θ0 variable layer of which characteristic of the Δθ0 is in a range which satisfies this conditional formula, the driving voltage in the related art θ0 uniform layer can be reduced to 80% or less.

$$\Delta\theta 0/\Delta\theta > 0.7$$

A θ0 variable layer of which characteristic of the Δθ0 is in this range, the driving voltage in the related art θ0 uniform layer can be reduced to 50% or less. This produces a significant effect. Liquid lenses with the characteristic described above can be driven with a driving voltage of about 10V or smaller and thus are suitable to be mounted on cameras and small equipment.

$$\Delta\theta 0/\Delta\theta > 0.9$$

A θ0 variable layer of which characteristic of the Δθ0 is in this range, the driving voltage in the related art θ0 uniform layer can be reduced to 30% or less. This produces a further significant effect. Liquid lenses with the characteristic described above can be driven with a driving voltage of about 5V or smaller and thus are suitable to be mounted on mobile equipment.

$$\Delta\theta 0/\Delta\theta > 0.97$$

A θ0 variable layer of which characteristic of the Δθ0 is in this range, the driving voltage in the related art θ0 uniform layer can be reduced to several tens of percents or less. Liquid lenses with the characteristic described above can operate with a low voltage. Liquid lenses with the characteristic described above can be driven with a driving voltage of about 2V or smaller and thus are suitable to be mounted on mobile equipment and low voltage driving equipment.

Fifteenth Embodiment

An example in which the liquid lens according to the present invention is used in an integrated manner with other optical members and semiconductor members will be described.

Figure 19:
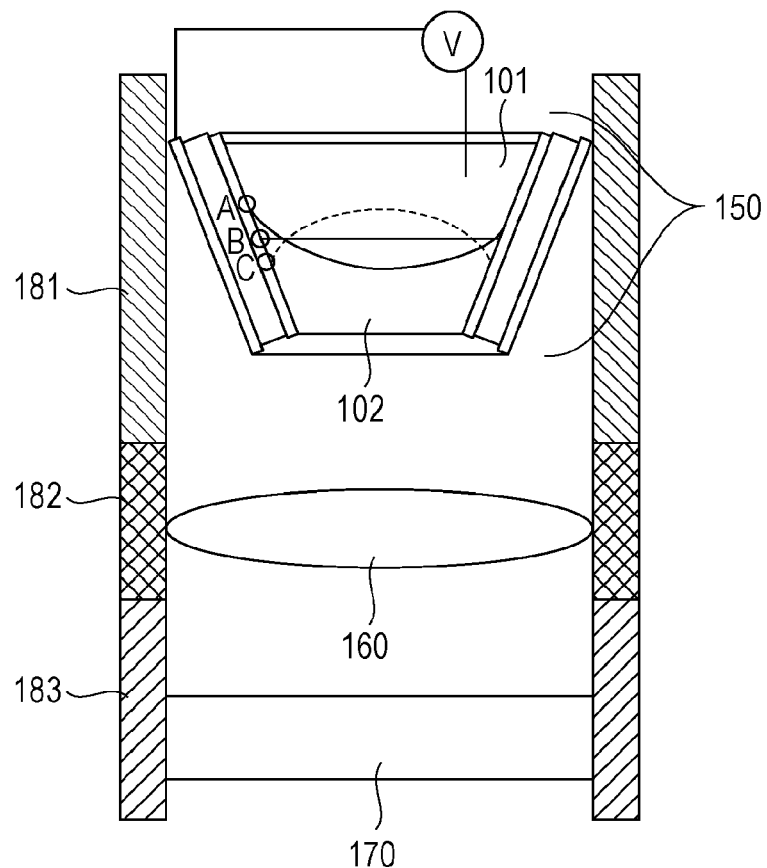
FIG. 19 is a schematic diagram of an optical member in which a liquid lens, a lens and other components are integrated according to the present invention.

FIG. 19 illustrates an example of an optical member in which a liquid lens 150 according to an embodiment of the present invention, a conventional lens 160 (i.e., a lens made of solid material, such as glass, plastic, quartz or the like), and an image pickup element 170, such as a complementary metal-oxide semiconductor (CMOS) sensor and a charged-coupled device (CCD) element, are integrated together using support members 181, 182 and 183.

A plurality of lenses 160 may also be used and various other forms are possible in which, for example, the lens 160 and the liquid lens 150 are situated in an inverted position and the liquid lens 150 is sandwiched between the lenses 160. Although three components, namely the liquid lens 150, the lens 160 and the image pickup element 170 are integrated together in FIG. 19, it is also possible that only the liquid lens 150 and the lens 160 are integrated together, or a liquid lens 150, which does not require any lens, and an image pickup element 170 are integrated together. It is also possible to integrate the liquid lens 150 and the support member 181 together and incorporate the integrated product on the front side of a camera unit which is constituted by a lens 160 and an image pickup element 170. It is also possible to constitute a zoom lens by a combined product of a liquid lens 150 and a plurality of lenses 160.

The liquid lens can be made compact: the liquid lens can be integrated with members having other functions to provide a compact product having a plurality of functions. Thus the liquid lens can be applied to digital cameras, camera-equipped mobile phones, network cameras such as monitoring cameras and optical members, such as projectors.

Sixteenth Embodiment

An example in which the liquid lens according to the sixteenth embodiment is applied to a digital camera will be described.

Figure 20:
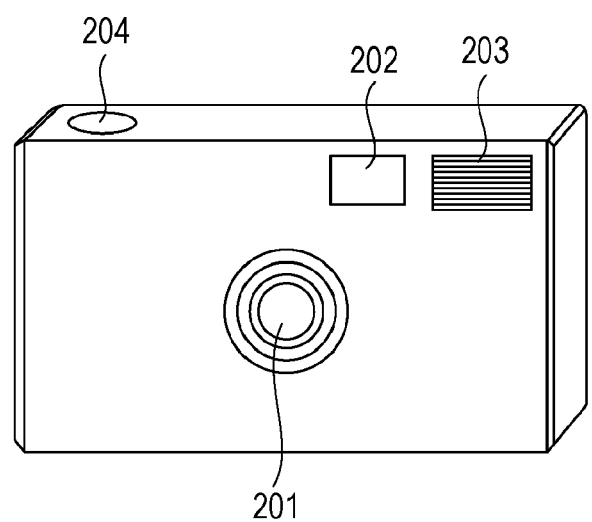
FIG. 20 is a schematic diagram of a camera which incorporates the liquid lens according to the present invention.

FIG. 20 is a schematic diagram illustrating an exterior of a digital camera to which the liquid lens according to at least one embodiment of the present invention is applied. The digital camera includes a photographic lens 201, a viewfinder 202, a flash light emitting unit 203 and a shutter switch 204.

Figure 21:
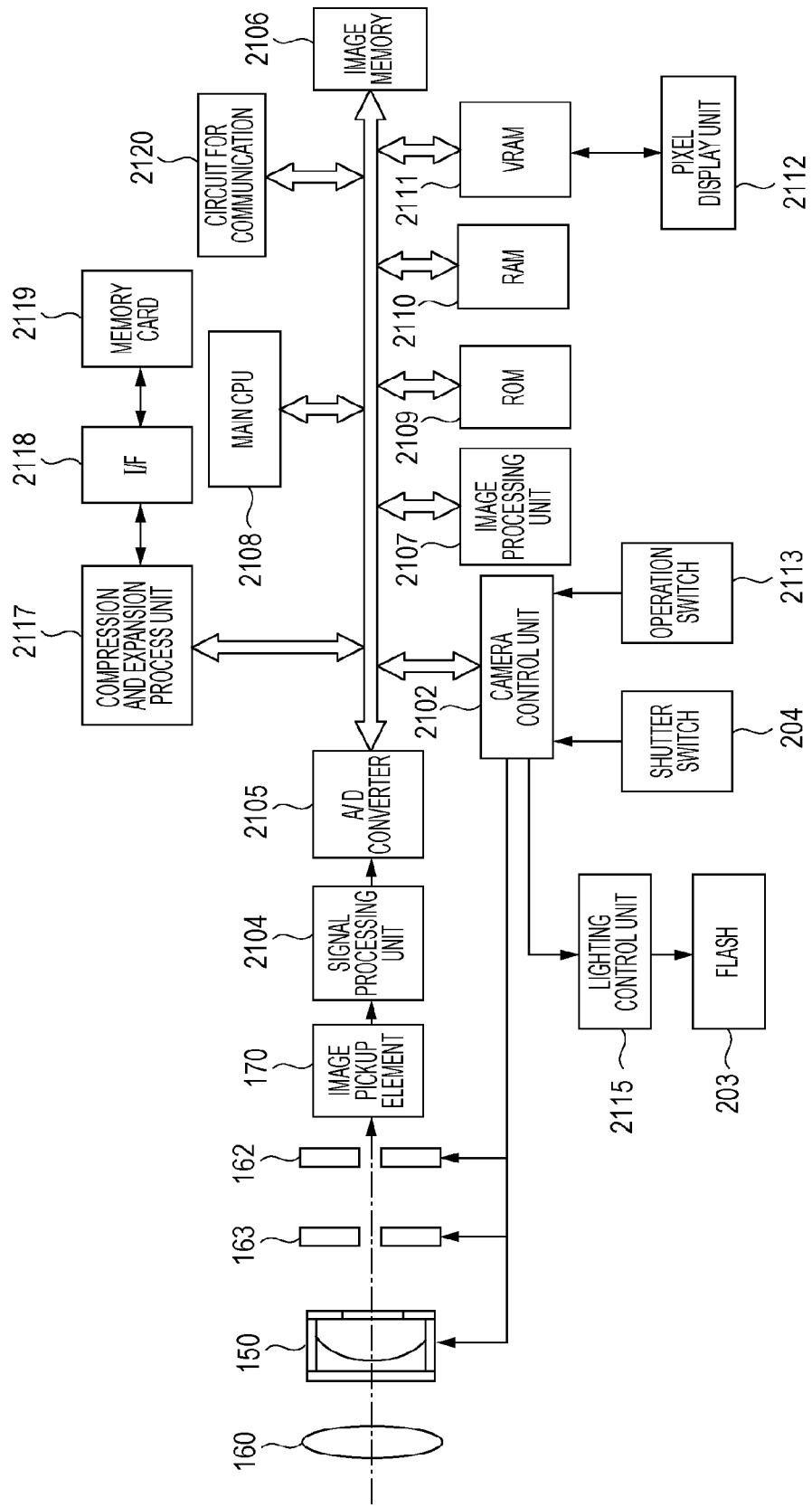
FIG. 21 is a schematic diagram of a main part of a digital camera which incorporates the liquid lens according to the present invention.

FIG. 21 is a block diagram of a main part of the digital camera illustrated in FIG. 20. The digital camera illustrated in FIG. 21 incorporates the liquid lens 150 in combination with the conventional lens 160. Light passed through the lens 160 and the liquid lens 150 forms an image on the image pickup element 170 via an aperture 163 and a shutter 162. The liquid lens 150, the aperture 163 and the shutter 162 are controlled by control signals from the camera control unit 2102. The digital camera according to the present embodiment can drive the liquid lens with a low voltage and adverse effects of noise on the image pickup element 170 can be reduced; thus excellent images can be recorded.

Although other members illustrated in FIG. 21 are common in the field of digital camera, they will be described briefly hereinafter. A signal processing unit 2104 performs analog signal processing. An A/D converter 2105 converts analog signals into digital signals. Image memory 2106 stores the digital signals. An image processing unit 2107 performs, for example, signal transformation and signal correction. A main CPU 2108 controls all the operations of the digital camera. A CPU 2108 controls, for example, the image processing unit 2107 and a camera control unit 2102 through an execution of a control program stored in a ROM 2109. A RAM 2110 provides a workspace for the execution of the program. Image memory 2111 stores photographed images to be displayed on a pixel display unit 2112. A compression and expansion process unit 2117 encodes image information in the image memory 2106. The encoded data is stored in the memory card 2119 via an I/F 2118. The camera control unit 2102 executes various operations in response to manipulation signals from the operation switch 2113. When the shutter switch 204 is pressed, the camera control unit 2102 sends signals to a lighting control unit 2115, which then performs predetermined operations, such as turning a flash 203 on.

Seventeenth Embodiment

An example in which the liquid lens according to an embodiment of the present invention is applied to a photographic lens of a camera-equipped mobile phone will be described.

Figure 22:
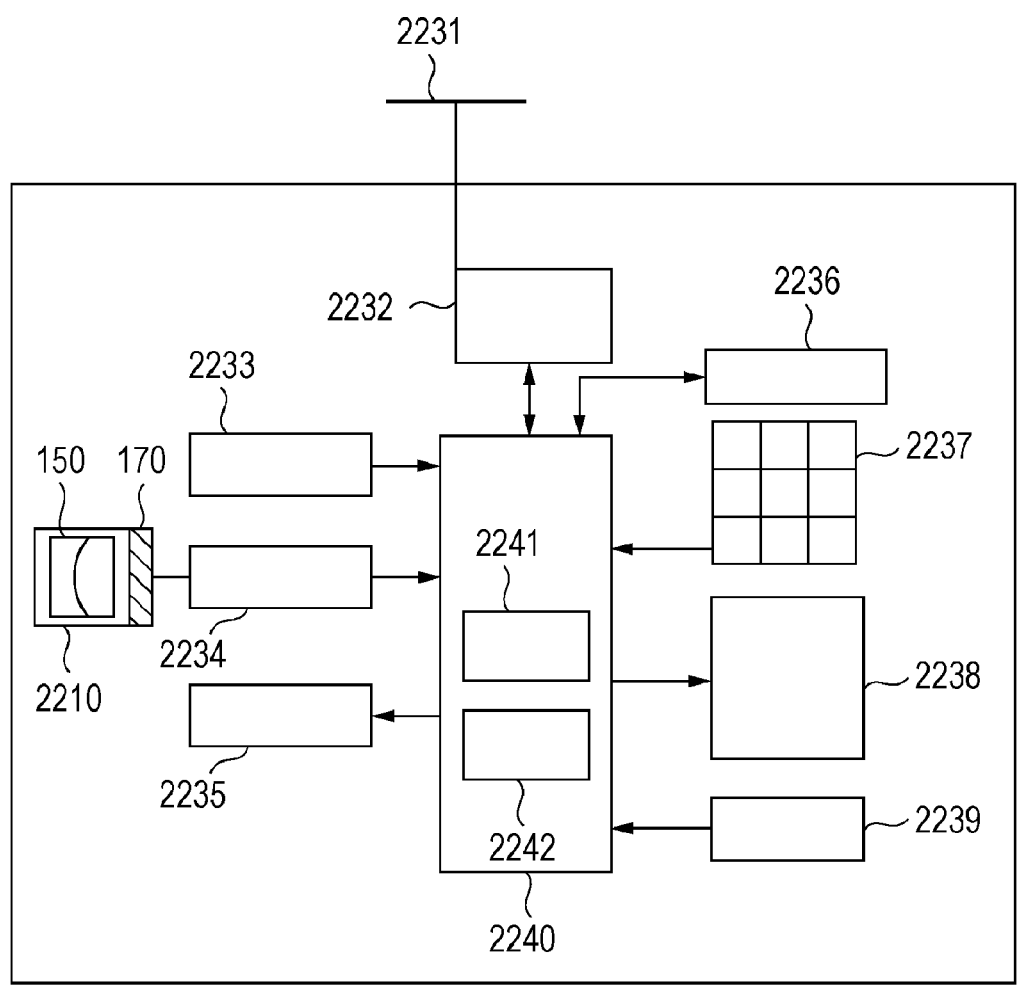
FIG. 22 is a schematic diagram of a main part of a mobile phone which incorporates the liquid lens according to the present invention.

FIG. 22 is a schematic diagram illustrating a main part of a mobile phone which incorporates the liquid lens according to the present invention. In the camera-equipped mobile phone illustrated in FIG. 22, a liquid lens 150 according to the present invention is used in a photographic lens unit 2210 of a camera 2234 and images are focused on an image pickup element 170, such as a CCD.

The liquid lens according to the present invention can be driven with a low voltage and can be made compact: this is advantageous for users of the mobile phone, which is required to be compact and lightweight, because the users can save the inconvenience of frequent battery charge.

Although other members illustrated in FIG. 22 are common in the field of camera-equipped mobile phone, they will be described briefly hereinafter. The camera-equipped mobile phone includes: a control unit 2240 which includes a CPU 2241 and a ROM 2242; an antenna 2231 and a radio unit 2232, which are connected to the control unit 2240; a microphone 2233, a receiver 2235 and an image storage unit 2236, in which images photographed with the camera 2234 are stored; and an operation key 2237, a display unit 2238, such as an LCD, and a shutter key 2239 used in the photographing with the camera.

Eighteenth Embodiment

An example in which the liquid lens according to the present invention is applied to a network camera will be described.

Figure 23A:
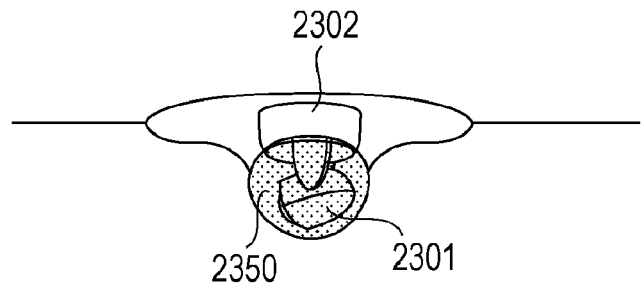
FIG. 23A is a schematic diagram of a network camera which incorporates the liquid lens according to the present invention.
Figure 23B:
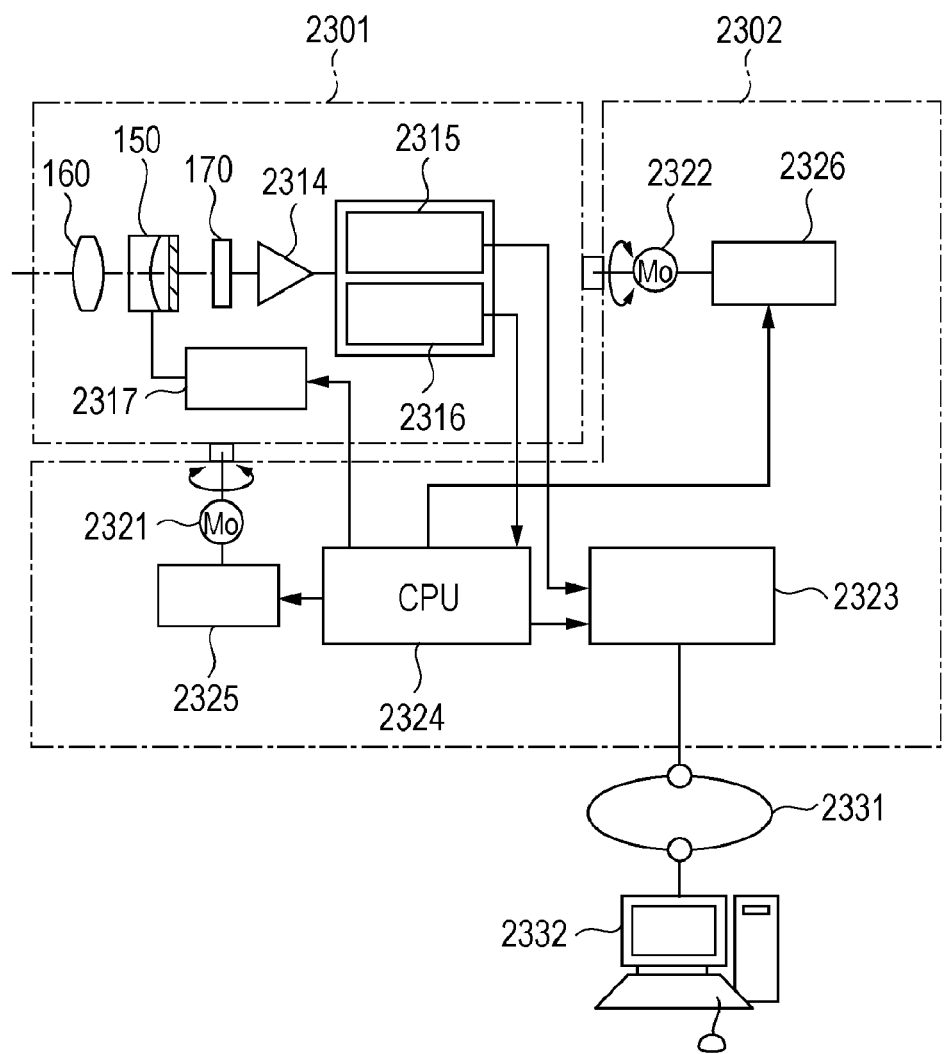
FIG. 23B is a block diagram of a network camera system.

FIG. 23A is a schematic diagram of an exterior of the network camera which incorporates the liquid lens according to the present invention. FIG. 23B is a block circuit diagram of a network camera system. A lens unit 2301, a camera platform unit 2302 and a cover which covers the lens unit 2301 are illustrated in FIG. 23A. As illustrated in FIG. 23B, it is a characteristic of the present embodiment that the liquid lens 150 according to the present invention is incorporated as one of the lenses which constitute the lens unit 2301. As illustrated in FIG. 23B, a lens unit 160, a liquid lens 150 and an image pickup element 170 are arranged along an optical axis and outputs of the image pickup element 170 are connected to an image processing circuit 2315 and a focus processing circuit 2316 via an amplifier 2314.

A panning direction driving motor 2321 and a tilt direction driving motor 2322 for driving the lens unit 2301 are provided in the camera platform unit 2302. An output of the image processing circuit 2315 is connected to a network processing circuit 2323 in the camera platform unit 2302 and an output of the focus processing circuit 2316 is connected to a CPU 2324. An output of the CPU 2324 is connected to an external LAN 2331 via the network processing circuit 2323 and a personal computer 2332 is connected to the LAN 2331.

Outputs of the CPU 2324 are connected to driving motors 2321 and 2322 via a pan-driving circuit 2325 and a tilt-driving circuit 2326 to supply driving signals to these circuits. The CPU 2324 is also connected to a liquid lens driving circuit 2317. The liquid lens 150 is driven by the liquid lens driving circuit 2317 and controls the focusing.

Since the liquid lens according to the present invention can be made compact, the network camera according to the present embodiment can also be made compact. The network camera according to the present embodiment can photograph remote images with the network camera which itself can be hidden: thus the network camera can be used as, for example, a monitoring camera and as a security camera for covertly taking live images in leisure venues.

TABLE 1

V-θ CHARACTERISTIC TABLE OF FIRST EMBODIMENT

| V DRIVING VOLTAGE | θ CONTACT ANGLE | θ0° | k = ε/2/d/γwo | ε: | d: 1 um | γ wo |
|---|---|---|---|---|---|---|
| 0 | 70.0000 | 70 | 1.481E−03 | 2.600E−11 | 1.000E−03 | 8.780E−06 |
| 1 | 71.0897 | 71 | 1.481E−03 | 2.600E−11 | 1.000E−03 | 8.780E−06 |
| 2 | 72.3564 | 72 | 1.481E−03 | 2.600E−11 | 1.000E−03 | 8.780E−06 |
| 3 | 73.7967 | 73 | 1.481E−03 | 2.600E−11 | 1.000E−03 | 8.780E−06 |
| 4 | 75.4072 | 74 | 1.481E−03 | 2.600E−11 | 1.000E−03 | 8.780E−06 |
| 5 | 77.1850 | 75 | 1.481E−03 | 2.600E−11 | 1.000E−03 | 8.780E−06 |
| 6 | 79.1278 | 76 | 1.481E−03 | 2.600E−11 | 1.000E−03 | 8.780E−06 |
| 7 | 81.2340 | 77 | 1.481E−03 | 2.600E−11 | 1.000E−03 | 8.780E−06 |
| 8 | 83.5030 | 78 | 1.481E−03 | 2.600E−11 | 1.000E−03 | 8.780E−06 |
| 9 | 85.9356 | 79 | 1.481E−03 | 2.600E−11 | 1.000E−03 | 8.780E−06 |
| 10 | 88.5340 | 80 | 1.481E−03 | 2.600E−11 | 1.000E−03 | 8.780E−06 |
| 11 | 91.3020 | 81 | 1.481E−03 | 2.600E−11 | 1.000E−03 | 8.780E−06 |
| 12 | 94.2460 | 82 | 1.481E−03 | 2.600E−11 | 1.000E−03 | 8.780E−06 |
| 13 | 97.3747 | 83 | 1.481E−03 | 2.600E−11 | 1.000E−03 | 8.780E−06 |
| 14 | 100.7006 | 84 | 1.481E−03 | 2.600E−11 | 1.000E−03 | 8.780E−06 |
| 15 | 104.2402 | 85 | 1.481E−03 | 2.600E−11 | 1.000E−03 | 8.780E−06 |
| 16 | 108.0163 | 86 | 1.481E−03 | 2.600E−11 | 1.000E−03 | 8.780E−06 |
| 17 | 112.0594 | 87 | 1.481E−03 | 2.600E−11 | 1.000E−03 | 8.780E−06 |

CONDITIONAL FORMULA = Δθ0/Δθ = 17/42 = 0.404

TABLE 2

V-θ CHARACTERISTIC TABLE OF FIRST COMPARATIVE EMBODIMENT

| V DRIVING VOLTAGE | θ CONTACT ANGLE | θ0° | k = ε/2/d/γwo | ε: | d: 1um | γ wo |
|---|---|---|---|---|---|---|
| 0 | 70.0000 | 70 | 1.481E−03 | 2.600E−11 | 1.000E−03 | 8.780E−06 |
| 5 | 72.2416 | 70 | 1.481E−03 | 2.600E−11 | 1.000E−03 | 8.780E−06 |
| 10 | 78.8162 | 70 | 1.481E−03 | 2.600E−11 | 1.000E−03 | 8.780E−06 |
| 15 | 89.4914 | 70 | 1.481E−03 | 2.600E−11 | 1.000E−03 | 8.780E−06 |
| 20 | 104.4914 | 70 | 1.481E−03 | 2.600E−11 | 1.000E−03 | 8.780E−06 |
| 21 | 108.1160 | 70 | 1.481E−03 | 2.600E−11 | 1.000E−03 | 8.780E−06 |
| 22 | 112.0001 | 70 | 1.481E−03 | 2.600E−11 | 1.000E−03 | 8.780E−06 |

CONDITIONAL FORMULA = Δθ0/Δθ = 0.0

TABLE 3

V-θ CHARACTERISTIC TABLE OF SECOND EMBODIMENT

| V DRIVING VOLTAGE | θ CONTACT ANGLE | θ0° | k = ε/2/d/γwo | ε: | d: 1um | γ wo |
|---|---|---|---|---|---|---|
| 0 | 70.0000 | 70 | 1.481E−03 | 2.600E−11 | 1.000E−03 | 8.780E−06 |
| 0.5 | 72.5222 | 72.5 | 1.481E−03 | 2.600E−11 | 1.000E−03 | 8.780E−06 |
| 1 | 75.0878 | 75 | 1.481E−03 | 2.600E−11 | 1.000E−03 | 8.780E−06 |
| 1.5 | 77.6954 | 77.5 | 1.481E−03 | 2.600E−11 | 1.000E−03 | 8.780E−06 |
| 2 | 80.3444 | 80 | 1.481E−03 | 2.600E−11 | 1.000E−03 | 8.780E−06 |
| 2.5 | 83.0345 | 82.5 | 1.481E−03 | 2.600E−11 | 1.000E−03 | 8.780E−06 |
| 3 | 85.7660 | 85 | 1.481E−03 | 2.600E−11 | 1.000E−03 | 8.780E−06 |
| 3.5 | 88.5399 | 87.5 | 1.481E−03 | 2.600E−11 | 1.000E−03 | 8.780E−06 |
| 4 | 91.3575 | 90 | 1.481E−03 | 2.600E−11 | 1.000E−03 | 8.780E−06 |
| 4.5 | 94.2209 | 92.5 | 1.481E−03 | 2.600E−11 | 1.000E−03 | 8.780E−06 |
| 5 | 97.1329 | 95 | 1.481E−03 | 2.600E−11 | 1.000E−03 | 8.780E−06 |
| 5.5 | 100.0970 | 97.5 | 1.481E−03 | 2.600E−11 | 1.000E−03 | 8.780E−06 |
| 6 | 103.1176 | 100 | 1.481E−03 | 2.600E−11 | 1.000E−03 | 8.780E−06 |
| 6.5 | 106.2003 | 102.5 | 1.481E−03 | 2.600E−11 | 1.000E−03 | 8.780E−06 |
| 7 | 109.3520 | 105 | 1.481E−03 | 2.600E−11 | 1.000E−03 | 8.780E−06 |
| 7.5 | 112.5812 | 107.5 | 1.481E−03 | 2.600E−11 | 1.000E−03 | 8.780E−06 |

CONDITIONAL FORMULA = Δθ0/Δθ = 37.5/42.6 = 0.881

TABLE 4

V-θ CHARACTERISTIC TABLE OF THIRD EMBODIMENT

| V DRIVING VOLTAGE | θ CONTACT ANGLE | θ0° | k = ε/2/d/γwo | ε: | d: 1um | γ wo |
|---|---|---|---|---|---|---|
| 0 | 70.0000 | 70 | 1.481E−03 | 2.600E−11 | 1.000E−03 | 8.780E−06 |
| 0.25 | 77.5054 | 77.5 | 1.481E−03 | 2.600E−11 | 1.000E−03 | 8.780E−06 |
| 0.5 | 85.0213 | 85 | 1.481E−03 | 2.600E−11 | 1.000E−03 | 8.780E−06 |
| 0.75 | 92.5478 | 92.5 | 1.481E−03 | 2.600E−11 | 1.000E−03 | 8.780E−06 |
| 1 | 100.0862 | 100 | 1.481E−03 | 2.600E−11 | 1.000E−03 | 8.780E−06 |
| 1.25 | 107.6390 | 107.5 | 1.481E−03 | 2.600E−11 | 1.000E−03 | 8.780E−06 |
| 1.5 | 115.2108 | 115 | 1.481E−03 | 2.600E−11 | 1.000E−03 | 8.780E−06 |

CONDITIONAL FORMULA = Δθ0/Δθ = 45/45.2 = 0.995

TABLE 5

V-θ CHARACTERISTIC TABLE OF FOURTH EMBODIMENT

| V DRIVING VOLTAGE | θ CONTACT ANGLE | θ0° | k = ε/2/d/γwo | ε: | d: 1um | γ wo |
|---|---|---|---|---|---|---|
| 0 | 70.0000 | 70 | 1.481E−03 | 2.600E−11 | 1.000E−03 | 8.780E−06 |
| 1 | 70.1577 | 70.0675 | 1.481E−03 | 2.600E−11 | 1.000E−03 | 8.780E−06 |
| 2 | 70.5478 | 70.1875 | 1.481E−03 | 2.600E−11 | 1.000E−03 | 8.780E−06 |
| 3 | 71.1836 | 70.375 | 1.481E−03 | 2.600E−11 | 1.000E−03 | 8.780E−06 |
| 4 | 72.0775 | 70.645 | 1.481E−03 | 2.600E−11 | 1.000E−03 | 8.780E−06 |
| 5 | 73.2410 | 71.0125 | 1.481E−03 | 2.600E−11 | 1.000E−03 | 8.780E−06 |
| 6 | 74.6850 | 71.4925 | 1.481E−03 | 2.600E−11 | 1.000E−03 | 8.780E−06 |
| 7 | 76.4199 | 72.1 | 1.481E−03 | 2.600E−11 | 1.000E−03 | 8.780E−06 |
| 8 | 78.4564 | 72.85 | 1.481E−03 | 2.600E−11 | 1.000E−03 | 8.780E−06 |
| 9 | 80.8064 | 73.7575 | 1.481E−03 | 2.600E−11 | 1.000E−03 | 8.780E−06 |
| 10 | 83.4832 | 74.8375 | 1.481E−03 | 2.600E−11 | 1.000E−03 | 8.780E−06 |
| 11 | 86.5036 | 76.105 | 1.481E−03 | 2.600E−11 | 1.000E−03 | 8.780E−06 |
| 12 | 89.8883 | 77.575 | 1.481E−03 | 2.600E−11 | 1.000E−03 | 8.780E−06 |
| 13 | 93.6647 | 79.2625 | 1.481E−03 | 2.600E−11 | 1.000E−03 | 8.780E−06 |
| 14 | 97.8695 | 81.1825 | 1.481E−03 | 2.600E−11 | 1.000E−03 | 8.780E−06 |
| 15 | 102.5528 | 83.35 | 1.481E−03 | 2.600E−11 | 1.000E−03 | 8.780E−06 |
| 16 | 107.7857 | 85.78 | 1.481E−03 | 2.600E−11 | 1.000E−03 | 8.780E−06 |
| 17 | 113.6726 | 88.4875 | 1.481E−03 | 2.600E−11 | 1.000E−03 | 8.780E−06 |

CONDITIONAL FORMULA = Δθ0/Δθ = 18.5/43.7 = 0.423

TABLE 6

V-θ CHARACTERISTIC TABLE OF FIFTH EMBODIMENT

| V DRIVING VOLTAGE | θ CONTACT ANGLE | θ0° | k = ϵ/2/d/γwo | ϵ: | d: 1um | γ wo |
|---|---|---|---|---|---|---|
| 0 | 70.0000 | 70 | 1.481E−03 | 2.600E−11 | 1.000E−03 | 8.780E−06 |
| 0.5 | 70.1575 | 70.135 | 1.481E−03 | 2.600E−11 | 1.000E−03 | 8.780E−06 |
| 1 | 70.4650 | 70.375 | 1.481E−03 | 2.600E−11 | 1.000E−03 | 8.780E−06 |
| 1.5 | 70.9521 | 70.75 | 1.481E−03 | 2.600E−11 | 1.000E−03 | 8.780E−06 |
| 2 | 71.6479 | 71.29 | 1.481E−03 | 2.600E−11 | 1.000E−03 | 8.780E−06 |
| 2.5 | 72.5816 | 72.025 | 1.481E−03 | 2.600E−11 | 1.000E−03 | 8.780E−06 |
| 3 | 73.7818 | 72.985 | 1.481E−03 | 2.600E−11 | 1.000E−03 | 8.780E−06 |
| 3.5 | 75.2772 | 74.2 | 1.481E−03 | 2.600E−11 | 1.000E−03 | 8.780E−06 |
| 4 | 77.0966 | 75.7 | 1.481E−03 | 2.600E−11 | 1.000E−03 | 8.780E−06 |
| 4.5 | 79.2688 | 77.515 | 1.481E−03 | 2.600E−11 | 1.000E−03 | 8.780E−06 |
| 5 | 81.8239 | 79.675 | 1.481E−03 | 2.600E−11 | 1.000E−03 | 8.780E−06 |
| 5.5 | 84.7931 | 82.21 | 1.481E−03 | 2.600E−11 | 1.000E−03 | 8.780E−06 |
| 6 | 88.2095 | 85.15 | 1.481E−03 | 2.600E−11 | 1.000E−03 | 8.780E−06 |
| 6.5 | 92.1099 | 88.525 | 1.481E−03 | 2.600E−11 | 1.000E−03 | 8.780E−06 |
| 7 | 96.5354 | 92.365 | 1.481E−03 | 2.600E−11 | 1.000E−03 | 8.780E−06 |
| 7.5 | 101.5344 | 96.7 | 1.481E−03 | 2.600E−11 | 1.000E−03 | 8.780E−06 |
| 8 | 107.1668 | 101.56 | 1.481E−03 | 2.600E−11 | 1.000E−03 | 8.780E−06 |
| 8.5 | 113.5113 | 106.975 | 1.481E−03 | 2.600E−11 | 1.000E−03 | 8.780E−06 |

CONDITIONAL FORMULA = Δθ0/Δθ = 37/43.5 = 0.850

TABLE 7

V-θ CHARACTERISTIC TABLE OF SIXTH EMBODIMENT

| V DRIVING VOLTAGE | θ CONTACT ANGLE | θ0° | k = ϵ/2/d/γwo | ϵ: | d: 1um | γ wo |
|---|---|---|---|---|---|---|
| 0 | 70.0000 | 70 | 1.481E−03 | 2.600E−11 | 1.000E−03 | 8.780E−06 |
| 0.25 | 71.0384 | 71.0328 | 1.481E−03 | 2.600E−11 | 1.000E−03 | 8.780E−06 |
| 0.5 | 72.8909 | 72.8688 | 1.481E−03 | 2.600E−11 | 1.000E−03 | 8.780E−06 |
| 0.75 | 75.7867 | 75.7375 | 1.481E−03 | 2.600E−11 | 1.000E−03 | 8.780E−06 |
| 1 | 79.9547 | 79.8685 | 1.481E−03 | 2.600E−11 | 1.000E−03 | 8.780E−06 |
| 1.25 | 85.6242 | 85.4913 | 1.481E−03 | 2.600E−11 | 1.000E−03 | 8.780E−06 |
| 1.5 | 93.0264 | 92.8353 | 1.481E−03 | 2.600E−11 | 1.000E−03 | 8.780E−06 |
| 1.75 | 102.3959 | 102.13 | 1.481E−03 | 2.600E−11 | 1.000E−03 | 8.780E−06 |
| 2 | 113.9758 | 113.605 | 1.481E−03 | 2.600E−11 | 1.000E−03 | 8.780E−06 |

CONDITIONAL FORMULA = Δθ0/Δθ = 43.6/44 = 0.992

TABLE 8

V-θ CHARACTERISTIC TABLE OF SEVENTH EMBODIMENT

| V DRIVING VOLTAGE | θ CONTACT ANGLE | θ0° | k = ϵ/2/d/γwo | ϵ: | d: 1um | γ wo |
|---|---|---|---|---|---|---|
| 0 | 70.0000 | 70 | 1.481E−03 | 2.600E−11 | 1.000E−03 | 8.780E−06 |
| 1 | 73.5885 | 73.5 | 1.481E−03 | 2.600E−11 | 1.000E−03 | 8.780E−06 |
| 2 | 76.1830 | 75.83333 | 1.481E−03 | 2.600E−11 | 1.000E−03 | 8.780E−06 |
| 3 | 78.3640 | 77.58333 | 1.481E−03 | 2.600E−11 | 1.000E−03 | 8.780E−06 |
| 4 | 80.3631 | 78.98333 | 1.481E−03 | 2.600E−11 | 1.000E−03 | 8.780E−06 |
| 5 | 82.2961 | 80.15 | 1.481E−03 | 2.600E−11 | 1.000E−03 | 8.780E−06 |
| 6 | 84.2294 | 81.15 | 1.481E−03 | 2.600E−11 | 1.000E−03 | 8.780E−06 |
| 7 | 86.2048 | 82.025 | 1.481E−03 | 2.600E−11 | 1.000E−03 | 8.780E−06 |
| 8 | 88.2508 | 82.80278 | 1.481E−03 | 2.600E−11 | 1.000E−03 | 8.780E−06 |
| 9 | 90.3883 | 83.50278 | 1.481E−03 | 2.600E−11 | 1.000E−03 | 8.780E−06 |
| 10 | 92.6337 | 84.13914 | 1.481E−03 | 2.600E−11 | 1.000E−03 | 8.780E−06 |
| 11 | 95.0012 | 84.72247 | 1.481E−03 | 2.600E−11 | 1.000E−03 | 8.780E−06 |
| 12 | 97.5039 | 85.26094 | 1.481E−03 | 2.600E−11 | 1.000E−03 | 8.780E−06 |
| 13 | 100.1549 | 85.76094 | 1.481E−03 | 2.600E−11 | 1.000E−03 | 8.780E−06 |
| 14 | 102.9683 | 86.2276 | 1.481E−03 | 2.600E−11 | 1.000E−03 | 8.780E−06 |
| 15 | 105.9603 | 86.6651 | 1.481E−03 | 2.600E−11 | 1.000E−03 | 8.780E−06 |
| 16 | 109.1503 | 87.07687 | 1.481E−03 | 2.600E−11 | 1.000E−03 | 8.780E−06 |
| 17 | 112.5623 | 87.46576 | 1.481E−03 | 2.600E−11 | 1.000E−03 | 8.780E−06 |

CONDITIONAL FORMULA = Δθ0/Δθ = 17.5/42.6 = 0.410

TABLE 9

V-θ CHARACTERISTIC TABLE OF EIGHTH EMBODIMENT

| V DRIVING VOLTAGE | θ CONTACT ANGLE | θ0° | k = ϵ/2/d/γwo | ϵ: | d: 1um | γ wo |
|---|---|---|---|---|---|---|
| 0 | 70.0000 | 70 | 1.481E−03 | 2.600E−11 | 1.000E−03 | 8.780E−06 |
| 0.5 | 78.5216 | 78.5 | 1.481E−03 | 2.600E−11 | 1.000E−03 | 8.780E−06 |
| 1 | 84.2519 | 84.16667 | 1.481E−03 | 2.600E−11 | 1.000E−03 | 8.780E−06 |
| 1.5 | 88.6076 | 88.41667 | 1.481E−03 | 2.600E−11 | 1.000E−03 | 8.780E−06 |
| 2 | 92.1562 | 91.81667 | 1.481E−03 | 2.600E−11 | 1.000E−03 | 8.780E−06 |
| 2.5 | 95.1822 | 94.65 | 1.481E−03 | 2.600E−11 | 1.000E−03 | 8.780E−06 |
| 3 | 97.8486 | 97.07857 | 1.481E−03 | 2.600E−11 | 1.000E−03 | 8.780E−06 |
| 3.5 | 100.2580 | 99.20357 | 1.481E−03 | 2.600E−11 | 1.000E−03 | 8.780E−06 |
| 4 | 102.4791 | 101.0925 | 1.481E−03 | 2.600E−11 | 1.000E−03 | 8.780E−06 |
| 4.5 | 104.5606 | 102.7925 | 1.481E−03 | 2.600E−11 | 1.000E−03 | 8.780E−06 |
| 5 | 106.5383 | 104.3379 | 1.481E−03 | 2.600E−11 | 1.000E−03 | 8.780E−06 |
| 5.5 | 108.4397 | 105.7546 | 1.481E−03 | 2.600E−11 | 1.000E−03 | 8.780E−06 |
| 6 | 110.2865 | 107.0623 | 1.481E−03 | 2.600E−11 | 1.000E−03 | 8.780E−06 |

CONDITIONAL FORMULA = Δθ0/Δθ = 37/40 = 0.920

TABLE 10

V-θ CHARACTERISTIC TABLE OF NINTH EMBODIMENT

| V DRIVING VOLTAGE | θ CONTACT ANGLE | θ0° | k = ϵ/2/d/γwo | ϵ: | d: 1um | γ wo |
|---|---|---|---|---|---|---|
| 0 | 70.0000 | 70 | 1.481E−03 | 2.600E−11 | 1.000E−03 | 8.780E−06 |
| 0.25 | 88.5708 | 88.5655 | 1.481E−03 | 2.600E−11 | 1.000E−03 | 8.780E−06 |
| 0.5 | 100.9641 | 100.9425 | 1.481E−03 | 2.600E−11 | 1.000E−03 | 8.780E−06 |
| 0.75 | 110.2761 | 110.2253 | 1.481E−03 | 2.600E−11 | 1.000E−03 | 8.780E−06 |

CONDITIONAL FORMULA = Δθ0/Δθ = 40.2/40.3 = 0.999

TABLE 11

V-θ CHARACTERISTIC TABLE OF TENTH EMBODIMENT

| V DRIVING VOLTAGE | θ CONTACT ANGLE | θ0° | k = ϵ/2/d/γwo | ϵ: | d: | γ wo |
|---|---|---|---|---|---|---|
| 0 | 70.0000 | 70 | 1.314E−03 | 3.900E−11 | 1.30E−03 | 1.141E−05 |
| 0.5 | 70.2600 | 70.24 | 1.314E−03 | 3.900E−11 | 1.300E−03 | 1.141E−05 |
| 1 | 70.8597 | 70.78 | 1.314E−03 | 3.900E−11 | 1.300E−03 | 1.141E−05 |
| 1.5 | 71.9183 | 71.74 | 1.314E−03 | 3.900E−11 | 1.300E−03 | 1.141E−05 |
| 2 | 74.3131 | 74 | 1.314E−03 | 3.900E−11 | 1.300E−03 | 1.141E−05 |
| 2.5 | 78.4807 | 78 | 1.314E−03 | 3.900E−11 | 1.300E−03 | 1.141E−05 |
| 3 | 83.6823 | 83 | 1.314E−03 | 3.900E−11 | 1.300E−03 | 1.141E−05 |
| 3.5 | 90.9224 | 90 | 1.314E−03 | 3.900E−11 | 1.300E−03 | 1.141E−05 |
| 4 | 98.2155 | 97 | 1.314E−03 | 3.900E−11 | 1.300E−03 | 1.141E−05 |
| 4.5 | 103.5636 | 102 | 1.314E−03 | 3.900E−11 | 1.300E−03 | 1.141E−05 |
| 5 | 106.9582 | 105 | 1.314E−03 | 3.900E−11 | 1.300E−03 | 1.141E−05 |
| 5.5 | 108.3844 | 106 | 1.314E−03 | 3.900E−11 | 1.300E−03 | 1.141E−05 |
| 6 | 109.3493 | 106.5 | 1.314E−03 | 3.900E−11 | 1.300E−03 | 1.141E−05 |
| 6.5 | 110.0527 | 106.7 | 1.314E−03 | 3.900E−11 | 1.300E−03 | 1.141E−05 |

CONDITIONAL FORMULA = Δθ0/Δθ = 36.7/40 = 0.916

TABLE 12

V-θ CHARACTERISTIC TABLE OF ELEVENTH EMBODIMENT

| V DRIVING VOLTAGE | θ CONTACT ANGLE | θ0° | k = ϵ/2/d/γwo | ϵ: | d: 1um | γ wo |
|---|---|---|---|---|---|---|
| 0 | 70.0000 | 70 | 2.115E−03 | 1.820E−11 | 7.000E−04 | 6.146E−06 |
| 0.5 | 70.8321 | 70.8 | 2.115E−03 | 1.820E−11 | 7.000E−04 | 6.146E−06 |
| 1 | 71.7277 | 71.6 | 2.115E−03 | 1.820E−11 | 7.000E−04 | 6.146E−06 |
| 1.5 | 72.6858 | 72.4 | 2.115E−03 | 1.820E−11 | 7.000E−04 | 6.146E−06 |

TABLE 12-continued

V-θ CHARACTERISTIC TABLE OF ELEVENTH EMBODIMENT

| V DRIVING VOLTAGE | θ CONTACT ANGLE | θ0° | k = ε/2/d/γwo | ε: | d: 1um | γ wo |
|---|---|---|---|---|---|---|
| 2 | 79.8928 | 79.4 | 2.115E−03 | 1.820E−11 | 7.000E−04 | 6.146E−06 |
| 2.5 | 87.1587 | 86.4 | 2.115E−03 | 1.820E−11 | 7.000E−04 | 6.146E−06 |
| 3 | 94.4933 | 93.4 | 2.115E−03 | 1.820E−11 | 7.000E−04 | 6.146E−06 |
| 3.5 | 101.9132 | 100.4 | 2.115E−03 | 1.820E−11 | 7.000E−04 | 6.146E−06 |
| 4 | 109.4439 | 107.4 | 2.115E−03 | 1.820E−11 | 7.000E−04 | 6.146E−06 |
| 4.5 | 109.9911 | 107.4 | 2.115E−03 | 1.820E−11 | 7.000E−04 | 6.146E−06 |
| 5 | 110.6048 | 107.4 | 2.115E−03 | 1.820E−11 | 7.000E−04 | 6.146E−06 |
| 5.5 | 111.2861 | 107.4 | 2.115E−03 | 1.820E−11 | 7.000E−04 | 6.146E−06 |

CONDITIONAL FORMULA = Δθ0/Δθ = 37.4/41.3 = 0.906

15

TABLE 13

V-θ CHARACTERISTIC TABLE OF TWELFTH EMBODIMENT

| V DRIVING VOLTAGE | θ CONTACT ANGLE | θ0° | k = ε/2/d/γwo | ε: | d: 1um | γ wo |
|---|---|---|---|---|---|---|
| 0 | 40.0000 | 40 | 5.932E−04 | 2.500E−11 | 1.200E−03 | 1.756E−05 |
| 1 | 42.0508 | 42 | 5.932E−04 | 2.500E−11 | 1.200E−03 | 1.756E−05 |
| 2 | 44.1954 | 44 | 5.932E−04 | 2.500E−11 | 1.200E−03 | 1.756E−05 |
| 3 | 46.4237 | 46 | 5.932E−04 | 2.500E−11 | 1.200E−03 | 1.756E−05 |
| 4 | 48.7276 | 48 | 5.932E−04 | 2.500E−11 | 1.200E−03 | 1.756E−05 |
| 5 | 51.1004 | 50 | 5.932E−04 | 2.500E−11 | 1.200E−03 | 1.756E−05 |
| 6 | 53.5368 | 52 | 5.932E−04 | 2.500E−11 | 1.200E−03 | 1.756E−05 |
| 7 | 56.0328 | 54 | 5.932E−04 | 2.500E−11 | 1.200E−03 | 1.756E−05 |
| 8 | 58.5854 | 56 | 5.932E−04 | 2.500E−11 | 1.200E−03 | 1.756E−05 |
| 9 | 61.1924 | 58 | 5.932E−04 | 2.500E−11 | 1.200E−03 | 1.756E−05 |
| 10 | 63.8528 | 60 | 5.932E−04 | 2.500E−11 | 1.200E−03 | 1.756E−05 |
| 11 | 66.5659 | 62 | 5.932E−04 | 2.500E−11 | 1.200E−03 | 1.756E−05 |
| 12 | 69.3322 | 64 | 5.932E−04 | 2.500E−11 | 1.200E−03 | 1.756E−05 |
| 13 | 72.1525 | 66 | 5.932E−04 | 2.500E−11 | 1.200E−03 | 1.756E−05 |
| 14 | 75.0285 | 68 | 5.932E−04 | 2.500E−11 | 1.200E−03 | 1.756E−05 |
| 15 | 77.9627 | 70 | 5.932E−04 | 2.500E−11 | 1.200E−03 | 1.756E−05 |
| 16 | 80.9581 | 72 | 5.932E−04 | 2.500E−11 | 1.200E−03 | 1.756E−05 |

CONDITIONAL FORMULA = Δθ0/Δθ = 32/42.2 = 0.781

TABLE 14

V-θ CHARACTERISTIC TABLE OF SECOND COMPARATIVE EMBODIMENT

| V DRIVING VOLTAGE | θ CONTACT ANGLE | θ0° | k = ε/2/d/γwo | ε: | d: 1um | γ wo |
|---|---|---|---|---|---|---|
| 0 | 40.0000 | 40 | 5.932E−04 | 2.500E−11 | 1.200E−03 | 1.756E−05 |
| 2 | 40.2110 | 40 | 5.932E−04 | 2.500E−11 | 1.200E−03 | 1.756E−05 |
| 4 | 40.8387 | 40 | 5.932E−04 | 2.500E−11 | 1.200E−03 | 1.756E−05 |
| 6 | 41.8676 | 40 | 5.932E−04 | 2.500E−11 | 1.200E−03 | 1.756E−05 |
| 8 | 43.2744 | 40 | 5.932E−04 | 2.500E−11 | 1.200E−03 | 1.756E−05 |
| 10 | 45.0310 | 40 | 5.932E−04 | 2.500E−11 | 1.200E−03 | 1.756E−05 |
| 12 | 47.1077 | 40 | 5.932E−04 | 2.500E−11 | 1.200E−03 | 1.756E−05 |
| 14 | 49.4753 | 40 | 5.932E−04 | 2.500E−11 | 1.200E−03 | 1.756E−05 |
| 16 | 52.1073 | 40 | 5.932E−04 | 2.500E−11 | 1.200E−03 | 1.756E−05 |
| 18 | 54.9811 | 40 | 5.932E−04 | 2.500E−11 | 1.200E−03 | 1.756E−05 |
| 20 | 58.0781 | 40 | 5.932E−04 | 2.500E−11 | 1.200E−03 | 1.756E−05 |
| 22 | 61.3842 | 40 | 5.932E−04 | 2.500E−11 | 1.200E−03 | 1.756E−05 |
| 24 | 64.8899 | 40 | 5.932E−04 | 2.500E−11 | 1.200E−03 | 1.756E−05 |
| 26 | 68.5901 | 40 | 5.932E−04 | 2.500E−11 | 1.200E−03 | 1.756E−05 |
| 28 | 72.4840 | 40 | 5.932E−04 | 2.500E−11 | 1.200E−03 | 1.756E−05 |
| 30 | 76.5757 | 40 | 5.932E−04 | 2.500E−11 | 1.200E−03 | 1.756E−05 |
| 32 | 80.8742 | 40 | 5.932E−04 | 2.500E−11 | 1.200E−03 | 1.756E−05 |

CONDITIONAL FORMULA = Δθ0/Δθ = 0.0

TABLE 15

V-θ CHARACTERISTIC TABLE OF THIRTEENTH EMBODIMENT

| V DRIVING VOLTAGE | θ CONTACT ANGLE | θ0° | k = ε/2/d/γwo | ε: | d: 1um | γ wo |
|---|---|---|---|---|---|---|
| 0 | 40.0000 | 40 | 5.932E−04 | 2.500E−11 | 1.200E−03 | 1.756E−05 |
| 0.5 | 41.0129 | 41 | 5.932E−04 | 2.500E−11 | 1.200E−03 | 1.756E−05 |
| 1 | 42.0508 | 42 | 5.932E−04 | 2.500E−11 | 1.200E−03 | 1.756E−05 |
| 1.5 | 43.1120 | 43 | 5.932E−04 | 2.500E−11 | 1.200E−03 | 1.756E−05 |
| 2 | 50.1772 | 50 | 5.932E−04 | 2.500E−11 | 1.200E−03 | 1.756E−05 |
| 2.5 | 57.2529 | 57 | 5.932E−04 | 2.500E−11 | 1.200E−03 | 1.756E−05 |
| 3 | 64.3398 | 64 | 5.932E−04 | 2.500E−11 | 1.200E−03 | 1.756E−05 |
| 3.5 | 71.4398 | 71 | 5.932E−04 | 2.500E−11 | 1.200E−03 | 1.756E−05 |
| 4 | 78.5554 | 78 | 5.932E−04 | 2.500E−11 | 1.200E−03 | 1.756E−05 |
| 4.5 | 79.7003 | 79 | 5.932E−04 | 2.500E−11 | 1.200E−03 | 1.756E−05 |
| 5 | 80.8617 | 80 | 5.932E−04 | 2.500E−11 | 1.200E−03 | 1.756E−05 |
| 5.5 | 82.0395 | 81 | 5.932E−04 | 2.500E−11 | 1.200E−03 | 1.756E−05 |

CONDITIONAL FORMULA = Δθ0/Δθ = 41/42 = 0.975

TABLE 16

V-θ CHARACTERISTIC TABLE OF FOURTEENTH EMBODIMENT

| V DRIVING VOLTAGE | θ CONTACT ANGLE | θ0° | k = ε/2/d/γ | ε: | d: 1um | γ LL |
|---|---|---|---|---|---|---|
| 0 | 40.0000 | 40 | 5.932E−04 | 2.500E−11 | 1.200E−03 | 1.756E−05 |
| 0.5 | 40.0132 | 40 | 5.932E−04 | 2.500E−11 | 1.200E−03 | 1.756E−05 |
| 1 | 40.0528 | 40 | 5.932E−04 | 2.500E−11 | 1.200E−03 | 1.756E−05 |
| 1.5 | 40.1188 | 40 | 5.932E−04 | 2.500E−11 | 1.200E−03 | 1.756E−05 |
| 2 | 50.1772 | 50 | 5.932E−04 | 2.500E−11 | 1.200E−03 | 1.756E−05 |
| 2.5 | 60.2450 | 60 | 5.932E−04 | 2.500E−11 | 1.200E−03 | 1.756E−05 |
| 3 | 70.3252 | 70 | 5.932E−04 | 2.500E−11 | 1.200E−03 | 1.756E−05 |
| 3.5 | 80.4225 | 80 | 5.932E−04 | 2.500E−11 | 1.200E−03 | 1.756E−05 |
| 4 | 80.5517 | 80 | 5.932E−04 | 2.500E−11 | 1.200E−03 | 1.756E−05 |
| 4.5 | 80.6981 | 80 | 5.932E−04 | 2.500E−11 | 1.200E−03 | 1.756E−05 |
| 5 | 80.8617 | 80 | 5.932E−04 | 2.500E−11 | 1.200E−03 | 1.756E−05 |

CONDITIONAL FORMULA = Δθ0/Δθ = 40/40.9 = 0.979

TABLE 17

VALUES OBTAINED FROM EMBODIMENTS AND COMPARATIVE EMBODIMENTS

| | Δθ0/Δθ | MAXIMUM VOLTAGE VH WHEN θ0 VARIABLE LAYER IS USED | MAXIMUM VOLTAGE VK WHEN θ0 UNIFORM LAYER IS USED | VOLTAGE REDUCTION RATIO Vh/Vk |
|---|---|---|---|---|
| FIRST EMBODIMENT | 0.404 | 17 | 22 | 0.773 |
| FIRST COMPARATIVE EMBODIMENT | 0 | 22 | 22 | 1.000 |
| SECOND EMBODIMENT | 0.881 | 7.5 | 22 | 0.341 |
| THIRD EMBODIMENT | 0.995 | 1.5 | 22 | 0.068 |
| FOURTH EMBODIMENT | 0.423 | 17 | 22 | 0.773 |
| FIFTH EMBODIMENT | 0.85 | 8.5 | 22 | 0.386 |
| SIXTH EMBODIMENT | 0.992 | 2 | 22 | 0.091 |
| SEVENTH EMBODIMENT | 0.41 | 17 | 22 | 0.773 |
| EIGHTH EMBODIMENT | 0.92 | 6 | 22 | 0.273 |
| NINTH EMBODIMENT | 0.999 | 0.75 | 22 | 0.034 |

TABLE 17-continued

VALUES OBTAINED FROM EMBODIMENTS AND COMPARATIVE EMBODIMENTS

| | $\Delta\theta0/\Delta\theta$ | MAXIMUM VOLTAGE VH WHEN θ0 VARIABLE LAYER IS USED | MAXIMUM VOLTAGE VK WHEN θ0 UNIFORM LAYER IS USED | VOLTAGE REDUCTION RATIO Vh/Vk |
|---|---|---|---|---|
| TENTH EMBODIMENT | 0.916 | 6.5 | 23 | 0.283 |
| ELEVENTH EMBODIMENT | 0.906 | 5.5 | 18 | 0.306 |
| TWENTIETH EMBODIMENT | 0.781 | 16 | 32 | 0.500 |
| SECOND COMPARATIVE EMBODIMENT | 0 | 32 | 32 | 1.000 |
| THIRTEENTH EMBODIMENT | 0.975 | 5.5 | 32 | 0.172 |
| FOURTEENTH EMBODIMENT | 0.979 | 5 | 32 | 0.156 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-188655 filed Aug. 25, 2010, which is hereby incorporated by reference herein in its entirety.

What is claimed is:

1. A liquid lens, comprising:
a vessel having an inner wall and configured to contain liquid;
an electrolyte liquid and a non-electrolyte liquid forming an interface therebetween and being contained in the vessel; and
a voltage applying unit which applies a voltage to the electrolyte liquid,
wherein a shape of the interface between the electrolyte liquid and the non-electrolyte liquid is changed by application of the voltage to the electrolyte liquid,
wherein the inner wall of the vessel has varying affinity with the non-electrolyte liquid depending on a position on the inner wall where an end of the interface contacts the inner wall, and
wherein the affinity on the side of the inner wall where the non-electrolyte liquid is situated is lower than on the side of the inner wall where the electrolyte liquid is situated.

2. The liquid lens according to claim 1, wherein the inner wall has the varying affinity along an optical axis direction of the liquid lens.

3. The liquid lens according to claim 1, wherein the vessel is cylindrical in shape and a central axis of the cylindrical vessel and an optical axis of the liquid lens are coincident with each other.

4. The liquid lens according to claim 3, wherein a section of the cylindrical vessel taken along a plane which includes the central axis of the cylindrical vessel is tapered.

5. The liquid lens according to claim 1, wherein $\Delta\theta0/\Delta\theta=(\theta0max-\theta00)/(\theta max-\theta00)>0.3$ is satisfied where θmax is the maximum value of the contact angle between the interface and the inner wall which are in contact with each other, θ0max is the contact angle at a position where the maximum value of the contact angle is obtained and no voltage is applied thereto, and θ00 is the contact angle θ where no voltage is applied thereto and the interface is situated closest to the electrolyte liquid.

6. The liquid lens according to claim 5, wherein dθ0/dV becomes the maximum where a minute change of a voltage V applied by the voltage applying unit in the vicinity of a region in which the refractive power of the lens is 0 is set to dV, and a minute change in the θ0 when the contact angle on the side of the non-electrolyte liquid between the interface and the inner wall which are in contact with each other is θ0 where no voltage is applied thereto is set to dθ0.

7. The liquid lens according to claim 5, wherein dθ0/dV becomes the minimum in the vicinity of a position at which the positive refractive power of the lens becomes the largest or the negative refractive power becomes the smallest where a minute change of a voltage V applied by the voltage applying unit is set to dV, and a minute change in the θ0 when the contact angle on the side of the non-electrolyte liquid between the interface and the inner wall which are in contact with each other is θ0 where no voltage is applied thereto is set to dθ0.

8. The liquid lens according to claim 1, wherein the inner wall is constituted by a formed layer.

9. The liquid lens according to claim 8, wherein the layer is formed by irradiating a layer formed of an oleophilic material with energy line of which irradiation amount is varied depending on the position.

10. A lens wherein the liquid lens according to claim 1 and a solid lens are integrated with each other.

11. A camera comprising the liquid lens according to claim 1.

12. The camera according to claim 11, wherein the camera is a digital camera.

13. The camera according to claim 11, wherein the camera is a network camera.

14. A camera-equipped mobile phone comprising the liquid lens according to claim 1.

15. The liquid lens according to claim 1, wherein the electrolyte liquid and the non-electrolyte liquid which are contained in the vessel are mutually immiscible.

16. A liquid lens, comprising:
a vessel having an inner wall and configured to contain liquid; and
a voltage applying unit configured to apply voltage to a liquid contained in the vessel, wherein an electrolyte liquid and a non-electrolyte liquid forming a contact interface therebetween are contained in the vessel, wherein a shape of the contact interface changes in response the voltage applied by the voltage applying unit, wherein the inner wall of the vessel has varying affinity with the non-electrolyte liquid depending on a position on the inner wall where an end of the interface contacts the inner wall, and wherein the affinity on the side of the inner wall where the non-electrolyte liquid is situated is lower than the affinity on the side of the inner wall where the electrolyte liquid is situated.

* * * * *